US011789986B1

(12) United States Patent
Bhimani et al.

(10) Patent No.: US 11,789,986 B1
(45) Date of Patent: Oct. 17, 2023

(54) METHODS AND SYSTEMS FOR QUERYING DATA WITHIN A GEOGRAPHICAL BOUNDARY USING A QUERY TOOL

(71) Applicant: T-Mobile Innovations LLC, Overland Park, KS (US)

(72) Inventors: Jeny Bhimani, Bothell, WA (US); Taha Lahrichi, Bellevue, WA (US); Farrah Young Lee, Bellevue, WA (US); James Byung Ha No, Covington, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 17/840,603

(22) Filed: Jun. 14, 2022

(51) Int. Cl.
*G06F 16/00* (2019.01)
*G06F 16/29* (2019.01)
*G06F 16/2455* (2019.01)
*G06F 16/242* (2019.01)
*G06F 16/332* (2019.01)

(52) U.S. Cl.
CPC ............ *G06F 16/29* (2019.01); *G06F 16/242* (2019.01); *G06F 16/2455* (2019.01); *G06F 16/3323* (2019.01)

(58) Field of Classification Search
CPC .................................................. G06F 16/3323
See application file for complete search history.

(56) References Cited

U.S. PATENT DOCUMENTS

| 8,185,103 | B2 | 5/2012 | Alfano et al. |
| 10,909,120 | B1 | 2/2021 | Mohamad et al. |
| 2008/0294678 | A1 | 11/2008 | Gorman et al. |
| 2010/0332593 | A1 | 12/2010 | Barash et al. |
| 2019/0129844 | A1 | 5/2019 | Zhang et al. |
| 2021/0266722 | A1* | 8/2021 | Pellegrini ............. H04W 4/021 |

OTHER PUBLICATIONS

Bhimani, Jeny, et al., "Methods and Systems for Efficient Data Importation for Data Visualization," filed May 10, 2022, U.S. Appl. No. 17/741,218.
Bhimani, Jeny, et al., "Visualization of Elevation Between Geographic Locations Using Segmented Vectors Based on Ground and Clutter Elevation Data," filed Jul. 14, 2022, U.S. Appl. No. 17/865,351.
Office Action dated Jun. 16, 2023, U.S. Appl. No. 17/741,218, filed May 10, 2022.

* cited by examiner

*Primary Examiner* — Ajith Jacob

(57) ABSTRACT

A method comprises receiving a request comprising parameters related to a data query and location information describing a geographic boundary, wherein the parameters indicate one or more types of data queried by a user of the workstation, communicating, by the export service application, with the geospatial database, to determine a format of data stored at the geospatial database, converting, by the export service application, a format of the parameters and the geographic boundary received in the request into query parameters that are formatted to be compatible with the geospatial database based on the format of data stored at the geospatial database, generating, by the export service application, a database query comprising the query parameters, wherein the database query is for retrieving data, from the geospatial database, that matches the parameters received in the request and is associated with a location within the geographic boundary.

20 Claims, 13 Drawing Sheets

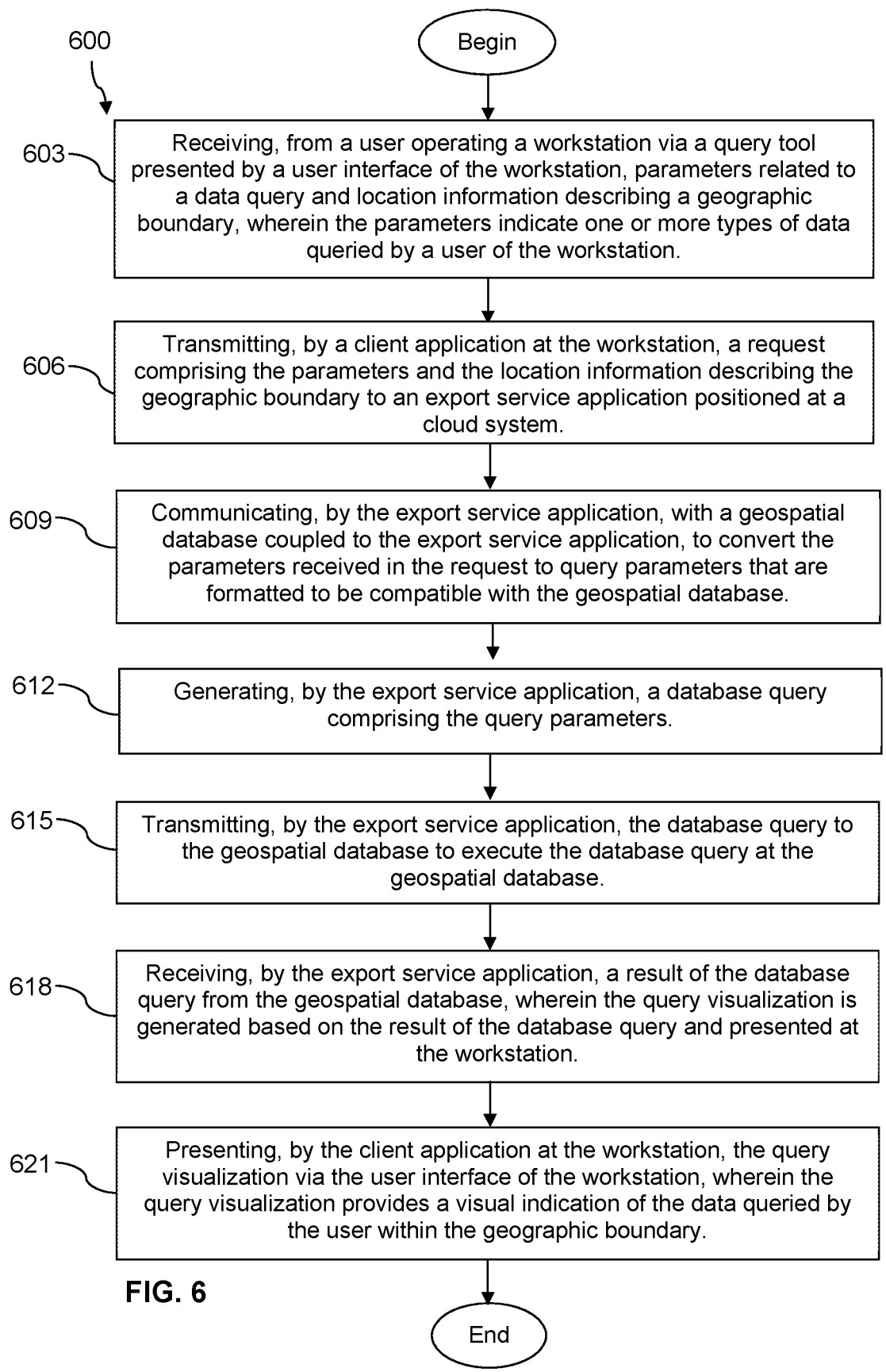

METHODS AND SYSTEMS FOR QUERYING DATA WITHIN A GEOGRAPHICAL BOUNDARY USING A QUERY TOOL

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In telecommunications, the radio coverage of a carrier network refers to a geographic area where a communication device may communicate with a cell site of a carrier, for example, with a signal strength above a threshold. Within this geographic area, a communication device may be able to complete a call using the carrier network or a partner network. Radio coverage may depend on several factors, such as physical obstacles, radio frequencies, and the sensitivity and transmit efficiency of consumer equipment. Different carrier networks may have different coverage at various geographic locations. For example, a carrier network may have greater signal strength in larger cities, but poor signal strength in more rural areas.

Carrier companies may establish retail stores at various locations throughout the country, without necessarily considering the radio coverage in the area at which the retail store is located. For example, a carrier company may arbitrarily position retail stores throughout various locations in the suburbs of larger cities. However, some of these locations may have little to no radio coverage of the carrier network. As a result, those particular retail stores may not receive many customers. In addition, the customers that purchase devices from those retail stores likely live proximate to the retail store, in an area that also has little to no coverage. In this case, the customers often return the device to the retail store shortly after purchase. Therefore, carrier retail stores in areas with little to no radio coverage are often unsuccessful and unprofitable.

SUMMARY

In an embodiment, a method performed by a system to generate a query visualization is disclosed. The method comprises obtaining, by a geospatial database, data from different source databases, converting and normalizing, by the geospatial database, the data received from the different source databases into files that are compatible with the geospatial database, storing the files in one or more memories at the geospatial database, receiving, from a user operating a workstation, via a query tool presented by a user interface of the workstation, parameters related to a data query and location information describing a geographic boundary, wherein the parameters indicate one or more types of data queried by a user of the workstation, transmitting, by a client application at the workstation, a request comprising the parameters and the location information describing the geographic boundary to an export service application positioned at a cloud system and coupled to the geospatial database, communicating, by the export service application, with the geospatial database, to convert the parameters received in the request to query parameters that are formatted to be compatible with the geospatial database, generating, by the export service application, a database query comprising the query parameters, transmitting, by the export service application, the database query to the geospatial database to execute the database query at the geospatial database, receiving, by the export service application, a result of the database query from the geospatial database, wherein the result of the database query comprises data from one or more of the files stored at the geospatial database, and wherein the query visualization is generated based on the result of the database query and presented at the workstation, and presenting, by the client application at the workstation, the query visualization overlaid on top of a multilayer geographic visualization indicating various types of data wherein the query visualization provides a visual indication of the data queried by the user within the geographic boundary.

In another embodiment, a method performed by a system to generate a query visualization is disclosed. The method comprises receiving, by an export service application communicatively coupled to a geospatial database, from a workstation, a request comprising parameters related to a data query and location information describing a geographic boundary, wherein the parameters indicate one or more types of data queried by a user of the workstation, communicating, by the export service application, with the geospatial database, to determine a format of data stored at the geospatial database, converting, by the export service application, a format of the parameters and the geographic boundary received in the request into query parameters that are formatted to be compatible with the geospatial database based on the format of data stored at the geospatial database, generating, by the export service application, a database query comprising the query parameters, wherein the database query is for retrieving data, from the geospatial database, that matches the parameters received in the request and is associated with a location within the geographic boundary, transmitting, by the export service application, the database query to the geospatial database to execute the database query at the geospatial database, and receiving, by the export service application, a result of the database query from the geospatial database, wherein the query visualization is generated based on the result of the database query and presented at the workstation, wherein the query visualization provides a visual indication of the data queried by the user within the geographic boundary.

In yet another embodiment, a system comprising a workstation and a cloud system is disclosed. The workstation comprises at least one processor, at least one non-transitory memory, and a client application stored in the at least one non-transitory memory, which when executed by the at least one processor, causes the at least one processor to be configured to receive, from a user operating the workstation via a query tool presented by a user interface of the workstation, parameters related to a data query and location information describing a geographic boundary, wherein the parameters indicate one or more types of data queried by a user of the workstation, and transmit a request comprising the parameters and the location information describing the geographic boundary to an export service application positioned at a cloud system. The cloud system comprises a geospatial database configured to store data used to generate a visualization, at least one processor, at least one non-transitory memory, an export service application stored in the at least one non-transitory memory, which when executed by the at least one processor, causes the at least one processor to be configured to communicate with a geospatial database coupled to the export service application, to convert the parameters received in the request to query parameters that are formatted to be compatible with the geospatial database, generate a database query comprising the query parameters, transmit the database query to the geospatial database to execute the database query at the geospatial database, and receive a result of the database query from the geospatial database, wherein a query visualization is generated based on the result of the database query and presented at the workstation, wherein the client application further causes the at least one processor to present the query visualization via the user interface of the workstation, wherein the query visualization provides a visual indication of the data queried by the user within the geographic boundary.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 6 is a flowchart of a second method according to an embodiment of the disclosure.

DETAILED DESCRIPTION

Figure 1:
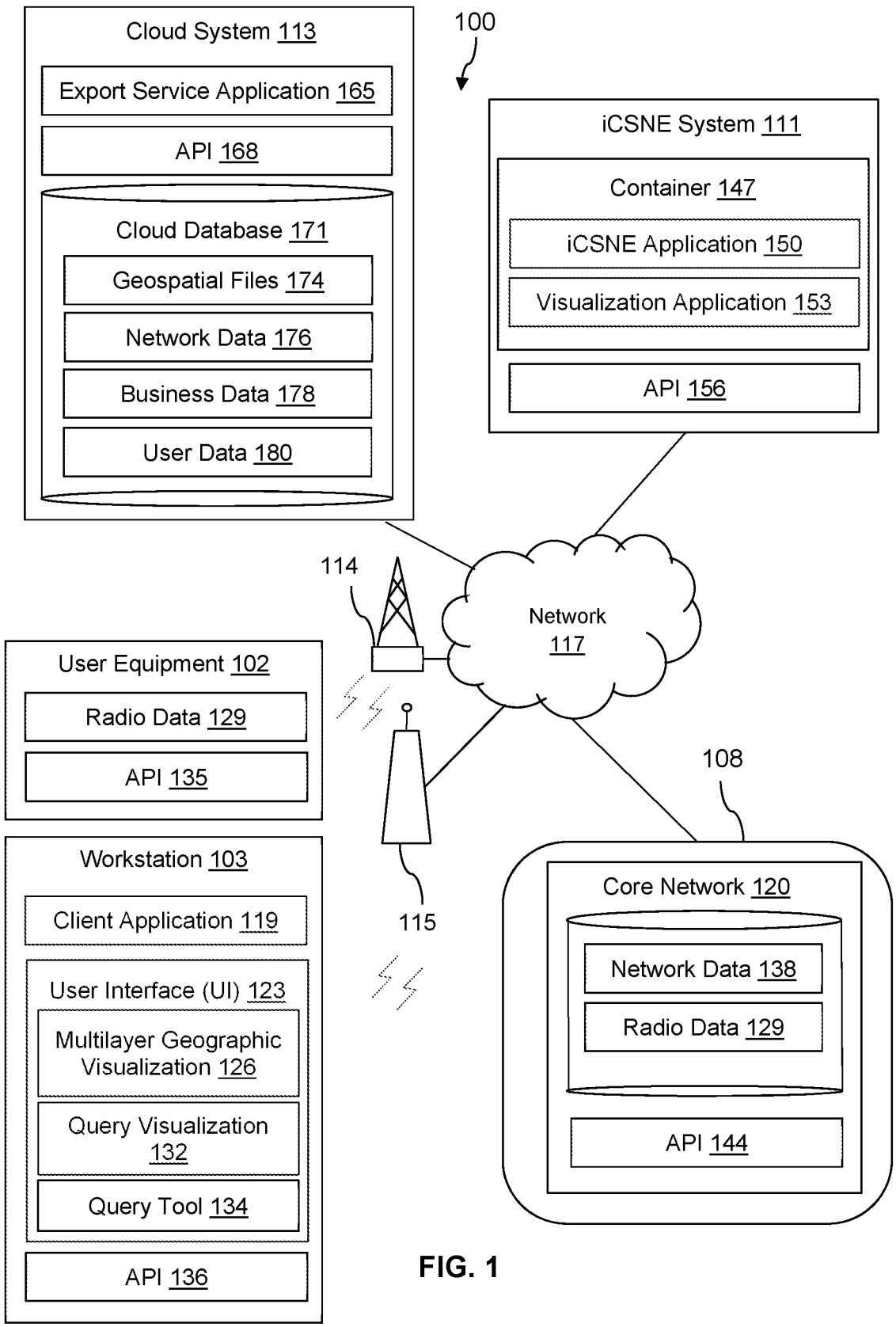
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

An Interactive Corporate Strategy and Network Experience (iCSNE) platform has been developed to better understand the reasoning behind certain retail store failures and to better determine the locations for potential new retail stores. The iCSNE platform may be implemented by an iCSNE system, which may either be included in a core network of a carrier network, included in a cloud system communicating with the carrier network, or external to the carrier network and/or the cloud system. An iCSNE system may generate multilayer geographic visualizations, such as a map, to illustrate various factors related to the carrier network radio coverage at one or more geographic areas. The multilayer geographic visualization may be generated based on various types of radio coverage data, in which the carrier network received the radio coverage data from various different sources. In some cases, the radio coverage data obtained from the various different sources may be referred to as layers. The iCSNE system may generate the multilayer geographic visualization, using the radio coverage data from the various different sources, in which the data obtained from each source is a different layer on the multilayer geographic visualization. The iCSNE system may send the multilayer geographic visualization to one or more workstations running an iCSNE client application for display at the workstation. In some cases, the user may utilize the multilayer geographic visualization to view the locations of existing cell sites and/or plan a location for future cell sites. Additional details regarding the iCSNE platform, the iCSNE system, and the multilayer geographic visualization is further described in U.S. patent application Ser. No. 17/741,218, by Jeny Bhimani, et. al., entitled "Methods and Systems for Efficient Data Important for Data Visualization," filed May 10, 2022, which is hereby incorporated by reference in its entirety (and hereinafter referred to as the "'218 Application").

In some cases, a user operating the workstation may desire to overlay other types of data, sometimes unrelated to the carrier network or the telecommunications field, on top of the multilayer geographic visualization to view patterns of the data and make business or personal decisions accordingly. A user may also desire to solely view a visual representation of such data within a particular geographical boundary. However, the process of gathering information within a geospatial boundary defined ad hoc by a user may involve the use of complex queries and computations, performed using various inaccessible geospatial libraries and functions. For example, groups with a company may maintain data related to different physical locations, and the data may be stored in different formats across each of the different groups. The access and filtering of such data may involve the manual creation of complex Structured Query Language (SQL) queries. Moreover, the users currently have no way of easily requesting and viewing the accessed and filtered data in a map format. Many users may be non-technical in nature (e.g., not skilled in constructing and executing sophisticated database queries) and could not be expected to create the foregoing complex SQL queries without assistance. Therefore, the lack any of system for assisting non-technical users to generate complex database queries for the accessing and filtering data across one or more databases gives rise to various technical problems in the technical field of database management.

Disclosed herein are embodiments directed to a query visualization system for solving the foregoing technical problems, by providing a resource efficient system for generating visualizations presenting queried data within a requested geographic boundary. The query visualization system may include a client workstation, a geospatial database located at a cloud system, an export service application in communication with the geospatial database and the workstation, and an iCSNE application executing at an iCSNE system in either the carrier network, at the cloud system, or external to both the carrier network and cloud system.

First, the query visualization system, or an operator/user of the query visualization system, may collect various types of data associated with geographic locations or geographic features from disparate database systems. The query visualization system may store the data in the geospatial database on the cloud system in association with location data. The location data may include latitude and longitude values and/or a range of latitude and longitude values (i.e., covering a geographic area between the outer limits of the range of latitude and longitude values). These types of data may include, for example, network data, business data, user data, and/or any other type of data, so long as the data is associated with a geographic location.

In some embodiments, the disparate database systems from which the data is obtained may be different source databases located at various cloud systems or data centers, or even publicly available open source information databases, such as, for example, land records, city records, and/or other publicly available information. The geospatial database may obtain the data from the disparate database systems, convert the data retrieved from the database systems into one or more geospatial files compatible with the geospatial database, and store the data at the geospatial database. To this end, pre-processing, normalization, and/or conversion functions may be performed on the collected data to seamlessly align and normalize the data retrieved from the different databases, before storing the data at the geospatial server.

The data stored at the geospatial database may also be obtained from import files uploaded by a user of a workstation interfacing with a workstation displaying a map or a multilayer geographic visualization. For example, the import file may contain data related to obesity statistics at various locations nationwide, pollen patterns at various locations nationwide during certain time periods, insect migration patterns at various locations nationwide during certain time periods, or any other statistic or pattern related to a geographic location. As discussed in the '218 Application, the import file may be formatted as, for example a Shapefile, a TAB file, a keyhole markup language (KML) file, or a comma separated value (CSV) file. A Shapefile may be a format for storing geometric location and attribute information of geographic features, a TAB file may be a tab-delimited text or data file containing tab-separated values, a KML file may be used to display geographic data in an Earth browser, and a CSV file may be a plain text file that contains a list of data using a comma to separate values. The geospatial database may convert the import file into one or more geospatial files compatible for storage at the geospatial database. Similar to that mentioned above, the geospatial database may perform pre-processing, normalization, and/or conversion functions on the different input files received from different users to seamlessly align and normalize the data, before storing the data at the geospatial server. In this way, the data stored at the geospatial database is not solely directed to network related data, but may also comprise business and personal user related data collected by the query visualization system.

In some embodiments, the network data, business data, and user data may be updated at the geospatial database upon certain conditions. For example, the data at the geospatial database may be updated when the open source databases are updated, and the geospatial database may pull the updated data from the open source databases accordingly. In another case, the data at the geospatial databases may be updated according to a pre-determined schedule. In yet another case, users may upload updated import files to the geospatial database to update the data stored at the geospatial database.

In an embodiment, the workstation may include a client application associated with the iCSNE platform. The client application may cause the workstation to display a map or a multilayer geographic visualization in the form of a map. The workstation may also display a query tool on the screen, which the user may interact with via a user interface (UI). In some embodiments, the user may interact with the query tool to enter or select various parameters for requesting a visual representation of data stored at the geospatial database. In an embodiment, the parameters that may be selected via the query tool may include layer groups, data layers, and/or data conditions. A layer group may indicate a category of one or more types of data. A data layer may indicate specific data aggregations within the selected category of the layer group. The data conditions may specify additional detail regarding the queried data.

For example, the query tool may present a drop-down list of several possible layer groups, and the user may select a layer group corresponding to statistical data. Upon selecting the statistical data, the query tool may present a drop-down list of several data layers within the layer group of statistical data. The user may select one such data layer corresponding to obesity statistics. In some cases, the user may further filter the types of obesity statistics being queried for using one or more data conditions. For example, the user may enter an age range of the obesity statistics being queried.

As another example, the query tool may present a drop-down list of several possible layer groups, and the user may select a layer group corresponding to building data. Upon selecting the building data, the query tool may present a text box for the user to manually type in using, for example, a keyboard of the workstation, a company name of the building data being queried. In this way, the query tool is not limited to drop-down lists of pre-organized data, but may also encompass the case in which the user manually types in strings related to data requesting to be visualized.

In an embodiment, the user may also interact with the multilayer geographic visualization presented for display at the workstation to select a geographical boundary by, for example, drawing a shape around the area or selecting several points around the geographical area to create a geographic boundary. In another embodiment, the user may select a pre-defined geographic boundary indicated in, for example, a drop-down list of the query tool. For example, the pre-defined geographic boundary may indicate a county, city, state, or country boundary, an engineering region of a company, a zip code, etc. The pre-defined geographic boundary may also be a visible map range of the entire geographic area displayed by the multilayer geographic visualization. The pre-defined boundary may also be pre-defined areas known to certain groups of users based on well-known regions or patterns within certain geographic locations. For example, beekeepers may acknowledge certain geographic areas as beekeeping geographic zones that pertain to some pattern of beekeeping, and allergy specialists may acknowledge certain geographic areas as being prone to certain allergen patterns at various times of the year. In this case, the beekeepers and allergy specialists may upload data regarding these geographic areas to the geospatial database and/or the iCSNE system as, for example, an import file. In this way, the geospatial database and/or the iCSNE system may also include pre-defined geographic boundaries received from users. Continuing with the example above, the user may select a pre-defined boundary from a drop-down list, or interact with the multilayer geographic visualization displayed on the workstation to input a geographic boundary (by selecting and/or drawing a shape around the geographic boundary).

After the workstation receives the parameters and geographic boundary from the user, the workstation may generate a request including the parameters and location information describing the geographic boundary (e.g., latitude and longitude coordinate ranges). The workstation may then send the request to an export service application that may be hosted at the same cloud system as the geospatial database or hosted at a different cloud system. In either case, the export service application may be authorized to communicate with the geospatial database. The export service application may communicate with the geospatial database to generate a database query based on the parameters and the geographical boundary. The export service application may communicate with the geospatial database to convert the parameters and geographic boundary received in the request into a format compatible with the geospatial database, to obtain query parameters. The export service application may generate a database query (e.g., an SQL query or query string) including the query parameters and send the database query to the geospatial database for execution across one or more databases or data stores in the geospatial database.

The geospatial database may execute the database query to obtain the results of the database query. The results may include the data queried for by the user, all within the geographic boundary defined by the user. The results may also include metadata for the data returned from the database query. The results of the database query may be used to generate the query visualization, a table format of the results that is compatible with the workstation, or a separate spreadsheet indicating the results in a text format. The query visualization may provide a visual indication of the data queried by the user within the geographic boundary, and the query visualization may be formatted in a human viewable visualization format. The table format of the results may be a table including multiple entries representing the results across in a text format. The spreadsheet of the results may be similar to the table, except that the spreadsheet is exported outside the client application. Other applications may access the data in the spreadsheet for various uses.

In an embodiment, the geospatial database may return the results to the export service application, and the export service application may have access to the geospatial libraries and functions used to generate the query visualization. In this embodiment, the export service application may generate (e.g., render) the query visualization, and transmit the query visualization to the workstation for display. The export service application may also generate the table format of the results in a format that is compatible with the workstation, and transmit the table format to the workstation for display. In another embodiment, the geospatial database may transmit the results to the visualization application at the iCSNE system, and the visualization application may have access to the geospatial libraries and functions used to generate the query visualization. In this embodiment, the visualization application may generate the query visualization, and transmit the query visualization to the workstation for display. The visualization application may also generate the table format of the results in a format that is compatible with the workstation, and transmit the table format to the workstation for display. In yet another embodiment, the workstation may have access to the geospatial libraries and functions used to generate the query visualization. In this embodiment, the client application at the workstation may generate the query visualization and tablet format of the results, and present the query visualization for display at the workstation.

In some embodiments, the query visualization may be overlaid on top of the multilayer geographic visualization presented for display at the workstation. In this case, the query visualization may be a visualization indicating current locations of the data queried for by the user. The current locations of the data may be indicated with a particular shape (e.g., simply a dot or an image of a building, tower, etc.), of various colors, on the map of the multilayer geographic visualization. In other embodiments, the query visualization may be a standalone visualization displayed separate from the multilayer geographic visualization. The query visualization may refer to any visual representation of the queried data, which is in a human viewable visualization format and compatible with the multilayer geographic visualization.

The query visualization may be used for various different business and/or personal purposes, such as, for example, business planning based on ongoing projects shown in the visualization, personal planning based on environmental patterns or use statistics, etc. The queried data may also be converted into a tabular form or exported into a spreadsheet for viewing the metadata, or more specifics of the data. For example, the exported data may be a CSV file that can be input into different software tools for use by the tools for various purposes.

As mentioned above, the geospatial database may store different types of data along with the radio coverage data related to the carrier network. In this way, the query visualization system may be used to arbitrarily intermix and overlay the different types of data on top of one another. For example, the workstation may already present radio coverage data in Texas on a multilayer geographic visualization, and the user may use the query tool to request obesity statistics in the different locations in Texas. The query visualization related to obesity statistics in Texas may be overlaid on top of the radio coverage data in Texas to create a completely unique dataset related to the geographic area of Texas. As another example, a user of the workstation may interact with the query tool to request a visualization of beekeeping patterns in Texas, and also request a visualization of allergen patterns in Texas. The resulting query visualization may provide a completely unique dataset bee patterns and allergens in the state of Texas, which may provide valuable insights into other environmental and foliage related fields. In this way, the query visualization system may be used to combine arbitrary pieces of data from the geospatial database in a novel, unique manner, further contributing to the study of correlations and possible causations between the pieces of data.

Therefore, the embodiments disclosed herein provide a query visualization system that enables users to provide a user input on a visualization map and/or using a query tool, such that an export service application at a cloud system generates a database query based on the user input. In other words, the export service application at the cloud system communicates with the geospatial database to generate an SQL query based on user input, instead of a user creating a complex SQL based on unknown factors at the geospatial database. In this way, the query visualization system enables a more computing and network resource efficient method by which to query data stored at a cloud, by using the export service application that generates the database query at the cloud system itself.

Turning now to FIG. 1, a communication system 100 is described. In an embodiment, the system 100 comprises a UE 102, a workstation 103, a carrier network 108, an iCSNE system 111, a cloud system 113, a cell site 114, a home network device 115, and a network 117. The UE 102 may be communicatively coupled to the carrier network 108, network 117, iCSNE system 111, and the cloud system 113 via the cell site 114 or the home network device 115. The workstation 103 may also be communicatively coupled to the carrier network 108, network 117, iCSNE system 111, and the cloud system 113 via the cell site 114 or the home network device 115.

The UE 102 may be a cell phone, a mobile phone, a smart phone, a personal digital assistant (PDA), an Internet of things (IoT) device, a wearable computer, a headset computer, a laptop computer, a tablet computer, a notebook computer, a medical monitoring device, a vehicle computer, etc. The UE 102 may store radio data 129, which may be collected using, for example, a carrier application running at the UE 102. The radio data 129 may include mappings between a particular geographic location and radio coverage data at that geographic location (e.g., radio coverage, signal strength, bandwidth, etc.). The UE 102 may also include one or more application programming interfaces (APIs) 135, which may be used to communicate with the carrier network 108, the iCSNE system 111, and/or the cloud system 113. For example, the UE 102 may collect the radio data 129 and transmit the radio data 129 to the core network 120 using API 135. The UE 102 may belong to a subscriber of the carrier network 108, registered with the carrier network 108.

The workstation 103 may be, for example, a desktop computer, laptop computer, tablet computer, notebook computer, or any other type of computer. A user of the workstation 103 may be a field engineer, carrier technologist, or employee of the carrier. Alternatively, the user of the workstation 103 may be any enterprise employee or any other user desiring to query data from the one or more databases located in the cloud system 113. The workstation 103 may execute a proprietary and restricted visualization tool, for example, using a client application 119. The client application 119 may correspond to the iCSNE system 111 and execute a client side of the iCSNE platform. The workstation 103 may include a UI 123, presented on a display of the workstation 103 with other data from the client application 119. A user operating the workstation 103 may interact with the client application 119 using the UI 123. The UI 123 may present the multilayer geographic visualization 126, which may be a visualization (e.g., a map) indicating radio coverage data, cell site locations, retail store locations, and any other data related to the carrier in relation to a geographic area. The UI 123 may also present the query visualization 132, which as described above, is a visual depiction of the data within a geographic boundary requested by the user. The UI 123 may also present the query tool 134, which as described above, is an interface by which the user may select or manually enter the parameters for a data query to be performed at a geospatial database in the cloud system 113. The user may select a geographic boundary on a map, such as the multilayer geographic visualization 126, by interacting with the UI 123. For example, the user may draw a desired geographic boundary on the map, for example using a mouse input device, an electronic pen input device, or a stylus touchscreen input device. As the user draws the desired geographic boundary, the presentation of the map on the display of the workstation 103 may update to present a line representation of the in-progress drawn input. The user may also select or enter the parameters for the query using the query tool 134 by interacting with the UI 123. The workstation 103 may also include one or more APIs 136, which may be used to communicate with the carrier network 108, the iCSNE system 111, and/or the cloud system 113.

The home network device 115 may be a modem, wireless router, and/or gateway configured to provide Internet access to UE 102 and/or workstation 103, for example, via the carrier network 108 and network 117. For example, the home network device 115 may be a wireless access point, through which the UE 102 and/or workstation 103 may access the Internet, the carrier network 108, the iCSNE system 111, and/or the cloud system 113. The cell site 114 provides the UE 102 and/or workstation 103 a wireless communication link to the carrier network 108, network 117, the iCSNE system 111, and/or the cloud system 113 according to a 5G, a long term evolution (LTE), a code division multiple access (CDMA), or a global system for mobile communications (GSM) wireless telecommunication protocol. The network 117 may be one or more private networks, one or more public networks, or a combination thereof. While FIG. 1 shows the carrier network 108, the iCSNE system 111, and the cloud system 113 as being separate from the network 117, it should be appreciated that, in some embodiments, at least a portion of the carrier network 108, the iCSNE system 111, and the cloud system 113 may be part of the network 117. In an embodiment, the workstation 103 may be coupled to the network 117 via a wired communication link.

The carrier network 108 may be a network including a radio access network (RAN) and a core network 120. The RAN may include the access network containing the radio elements of a cell network, and the core network 120 may include the elements that manage the subscriber information, call setup and routing, and related system supports. In an embodiment, the core network 120 may be an evolved packet core (EPC) core network. The core network 120 may be a configured to implement a 5G, a LTE, a CDMA, or a GSM wireless telecommunication protocol. In one embodiment, the core network 120 may be a 3rd Generation Partnership Project (3GPP) Evolved Packet System (EPS).

The core network 120 may store radio coverage data received from various different sources. In an embodiment, the radio coverage data may include a network data 138 and radio data 129. The network data 138 may include radio coverage data or network attribute data related to the coverage provided by the carrier network 108 at one or more network elements within the network 117 and the carrier network 108. The radio coverage data or network attribute data included in the network data 138 may include, for example, signal strength, bandwidth (e.g., frequency bands), latency, throughput, supported wireless technologies, types of devices communicating with the network element, antenna patterns, etc. One or more network elements in the network 117 and/or carrier network 108 may determine or measure the network data 138 for the carrier based on communications with devices registered with the carrier. The network elements may transmit the network data 138 to the core network 120 for storage at the core network 120, or elsewhere within the carrier network 108, or even external to the carrier network 108.

The radio data 129 may be received from devices registered with the carrier, such as UE 102. The radio data 129 may include the mappings between a particular geographic location and radio coverage data at that geographic location. The core network 120 may store other data received from various other sources and publicly available information.

As described in the '218 Application, the iCSNE system 111 may access the network data 138 and/or the radio data 129 at the core network 120 to create one or more layers in a multilayer geographic visualization 126, which may be sent to the workstation 103. The carrier network 108 may also include one or more APIs 144, which may be used to communicate with the UE 102, workstation 103, iCSNE system 111, and/or cloud system 113. While FIG. 1 shows the core network 120 as storing network data 138 and radio data 139, it should be appreciated that the core network 120 also includes other data and applications not otherwise shown in FIG. 1.

The iCSNE system 111 may include a set of servers with storage, processing, and communication capabilities. While the iCSNE system 111 is shown as separate from the carrier network 108 and the cloud system 113 in FIG. 1, in an embodiment, the iCSNE system 111 may be part of the carrier network 108 and/or the cloud system 113. In another embodiment, the iCSNE system 111 may be external to the carrier network 108 and/or the cloud system 113. The iCSNE system 111 may be communicatively coupled to the UE 102, workstation 103, carrier network 108, network 117, and cloud system 113 via the cell site 114, such that the iCSNE system 111 may communicate with the UE 102, workstation 103, carrier network 108, network 117, and cloud system 113 via the cell site 114.

The iCSNE system 111 may include a software container 147 and one or more APIs 156. The container 147 is a software package including code, files, and dependencies such that one or more applications may execute quickly and reliably when the container 147 is transferred from one computing environment to another. For example, the container 147 may be a DOCKER container. The container 147 may store an iCSNE application 150, and a runtime environment, tools, libraries, settings, and other dependencies for the iCSNE application 150. The iCSNE application 150 may be responsible for at least a portion of the processing and communications involved to generate a multilayer geographic visualization 126 using import files carrying radio coverage data, radio data 129, and/or network data 128. The iCSNE application 150 may be responsible for at least a portion of the processing and communications involved to generate the query visualization 132 using the network data 176, business data 178, and/or user data 180 at the cloud database 171. The container 147 may also store a visualization application 153, which may be used to render the multilayer geographic visualization 126 and/or the query visualization 132, or which may communicate with other systems to generate the multilayer geographic visualization 126 and/or the query visualization 132. While the visualization application 153 is shown in FIG. 1 as being included in the container 147, in another embodiment, the visualization application 153 may be external to the container 147, but still stored at the iCSNE system 111. Although FIG. 1 shows the iCSNE application 150 and the visualization application 153 as being separate, in an embodiment, the function of the visualization application 153 may be part of the iCSNE application 150. The APIs 156 may also be used to communicate with the UE 102, workstation 103, the carrier network 109, and/or the cloud system 100. It should be appreciated that the iCSNE system 111 may include other components and applications not otherwise shown in FIG. 1.

The cloud system 113 may be implemented as a cloud computing environment and may provide an on-demand availability of data storage and processing resources, without direct active management by the carrier. The cloud system 113 may comprise multiple servers and memories (e.g., databases and data stores), often distributed over multiple locations, with each location being a data center. The cloud system 113 may be owned and operated by a cloud host. The cloud system 113 may offer a pay-as-you-go model, in which users pay for storage and processing resources as they are used, which can help reduce capital expenses for operations.

As shown in FIG. 1, the cloud system 113 includes an export service application 165, one or more APIs 168, and a cloud database 171 (also referred to herein as the "geospatial database"). As described herein, the export service application 165 receives a request for a visualization of data from the workstation 103, in which the request includes the parameters and a geographic boundary. The export service application 165 actually generates the database query with the proper query parameters to retrieve the requested data from the cloud database 171. The export service application 165 transmits the database query to the cloud database 171 for execution at the cloud database 171 to retrieve the requested data, as described herein. The requested data returned from the cloud database 171 may be used to generate the query visualization 132, a table form of the results, and/or a spreadsheet of the results.

The cloud database 171 may refer to a geospatial database, databases or data stores in the cloud system 113, which are managed using a relational database management system. For example, a cloud database 171 may be a POSTGRES database. The cloud database 171 may store geospatial files 174 used to generate the multilayer geographic visualizations 126, and may store the network data 176, business data 178, and user data 180 used to generate the query visualizations 132. A geospatial file 174 contains geographical information that is associated with a geographic location or position. The geospatial file 174 may have a geometric representation such as points, polygons, or lines. The network data 176 may include the radio coverage data at various locations, cell site related data, population density data, retail store data, etc. The business data 178 may include building data, employee data related to the building data, company data, etc. The user data 180 may include any other type of data that may not be categorized as network data or business data. For example, the user data may be statistical data, environmental data, migration data, sports and recreational data, etc. The cloud database 171 may store the network data 176, business data 178, and user data 180 as geospatial files 174 based on different import files received from different users operating the workstations 103.

As mentioned above, the network data 176, business data 178, and user data 180 may be received from disparate databases, both open source and not. The cloud database 171 may receive the network data 176, business data 178, and user data 180 and convert the network data 176, business data 178, and user data 180 into a format (e.g., a geospatial format) that is compatible with the cloud database 171, the iCSNE system 111, and the other data stored at the cloud database 171. In an embodiment, the cloud database 171 may perform pre-processing, normalization, and/or conversion functions may be performed on the network data 176, business data 178, and user data 180 to seamlessly align and normalize the data retrieved from various different types of databases, before storing the data at the cloud database 171.

While FIG. 1 shows the cloud system 113 as including the cloud database 171, in an embodiment, the cloud database 171 may be external to the cloud system 113, or even stored at a separate cloud system owned by a different cloud host. A single cloud host, or multiple different cloud hosts, may own and operate the elevation application 165 and cloud database 171 in the cloud system 113. In addition, while the export service application 165 and cloud database 171 are shown to be located in the same cloud system 113, in another embodiment, the export service application 165 and cloud database 171 may be located in different cloud systems 113. Nevertheless, the export service application 165 and cloud database 171 may be authorized to communicate with one another such that the export service application 165 may transmit database queries to the cloud database 171 for execution on the data in the cloud database 171. In an embodiment, the functionality provided by the cloud system 113 in FIG. 1 may be provided by one or more computers of a business enterprise. The APIs 168 may be used to communicate with the UE 102, workstation 103, carrier network 108, and/or the iCSNE system 111. While FIG. 1 shows the cloud system 113 including only the export service application 165, the API 168, and the cloud database 171, it should be appreciated that the cloud system 113 may include other components not shown in FIG. 1.

Figure 2:
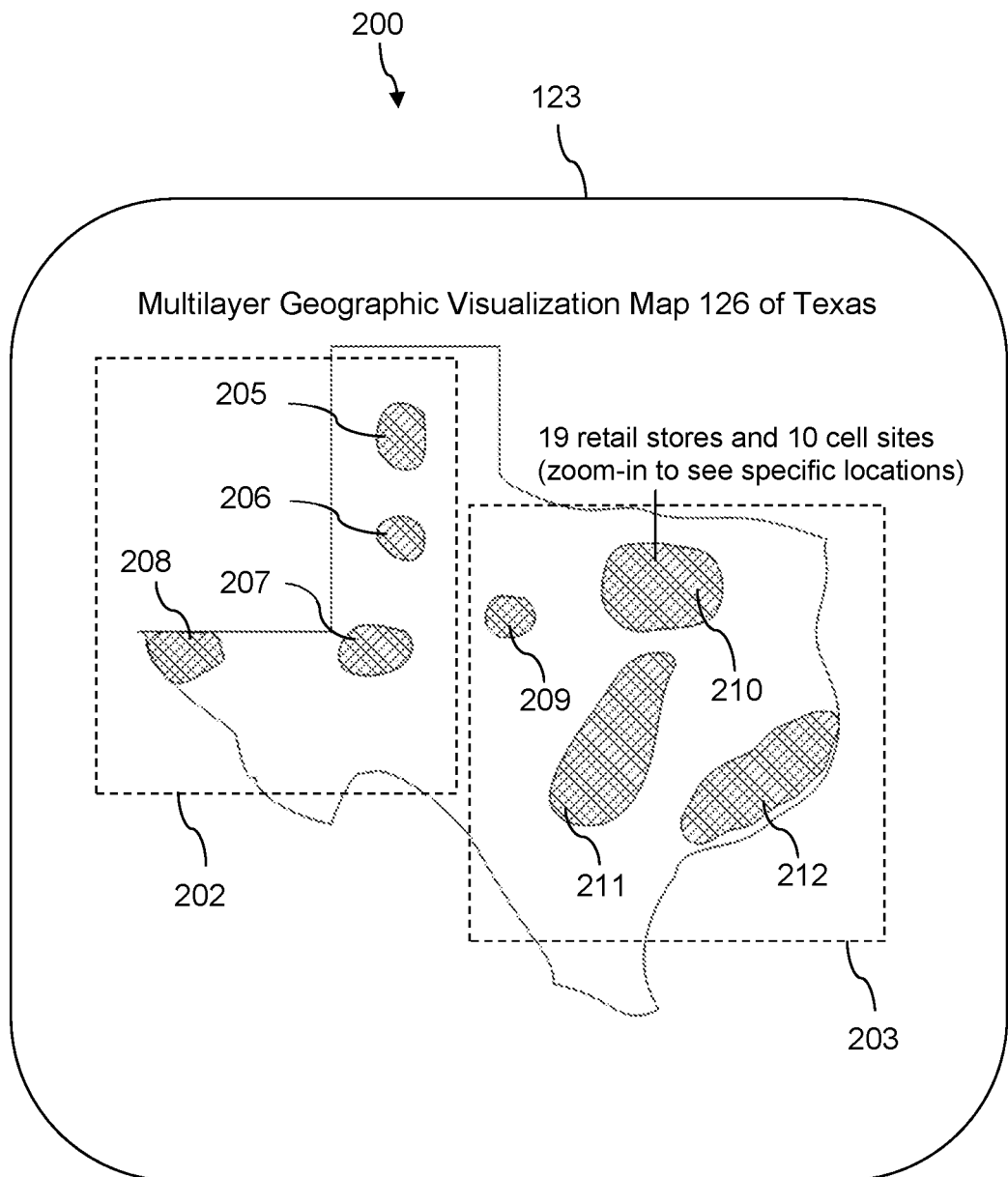
FIG. 2 is an illustration of an example user interface screen presented at a workstation of the communication system of FIG. 1 according to an embodiment of the disclosure.

Turning to FIG. 2, a screen 200 of the UI 123 presented on the workstation 103 is described. The UI 123 displays an example of a multilayer geographic visualization 126 of the state of Texas. In an embodiment, the client application 119 may generate the UI 123, and may communicate with the carrier network 108, the iCSNE system 111, and/or the cloud system 113 via a series of API calls using the APIs 135, 144, 156, and 168 based on instructions and data received via the UI 123. The client application 119 may also present multilayer geographic visualization 126 on the UI 123.

The multilayer geographic visualization 126 presents geographic areas 205-212 in Texas with radio coverage from the carrier network 108. For example, communications signals being transmitted between devices registered with the carrier and one or more cell sites 114 in the geographic areas 205-212 may have a signal strength above a certain threshold, to be a geographic area 205-212 included in the multilayer geographic visualization 126.

A user may zoom in to one of these geographic areas 205-212 to see additional information regarding the geographic area 205-212. For example, the geographic area 210 may represent the Dallas/Ft. Worth metroplex, and a user may interact with the UI 123 to zoom into the geographic area 210 to view additional details regarding the geographic area 210. Once geographic area 210 has been zoomed in, the UI 123 may present a second screen including additional details on a zoomed in version of multilayer geographic visualization 126. The additional details may include, for example, the specific locations of the retail stores present in the geographic area 210, specific locations and/or types of the cell sites 114 present in the geographic area 210, types of radio coverage within various areas of the geographic area 210, etc. For example, the geographic area 210 may include different shadings throughout the multilayer geographic visualization 126 to illustrate the signal strength at various locations in the geographic area 210.

As shown in FIG. 2, the UI 123 presents two layers 202 and 203 of data on the multilayer geographic visualization 126. The first layer 202 includes the geographic areas 205-208, and the second layer 203 includes the geographic areas 209-212. The different layers 202 and 203 may be associated with different types of data, sources of data, and/or import files. For example, the data used to generate the first layer 202 may include network data 138, while the data used to generate the layer 203 may include the radio data 129. As another illustrative example, the data used to generate the first layer 202 may have originated from a first source, which may have been created by a carrier technologist who gathered the radio coverage data describing the geographic areas 205-208. Meanwhile, the data used to generate the second layer 203 may have originated from a second source, which may have also been created by a carrier technologist who gathered the radio coverage data describing the geographic areas 209-212. Each carrier technologist may operate a workstation 103 to upload data and generate a respective geospatial file 174, until the visualization application 153 creates a layer in a human visualization format.

Figure 3A:
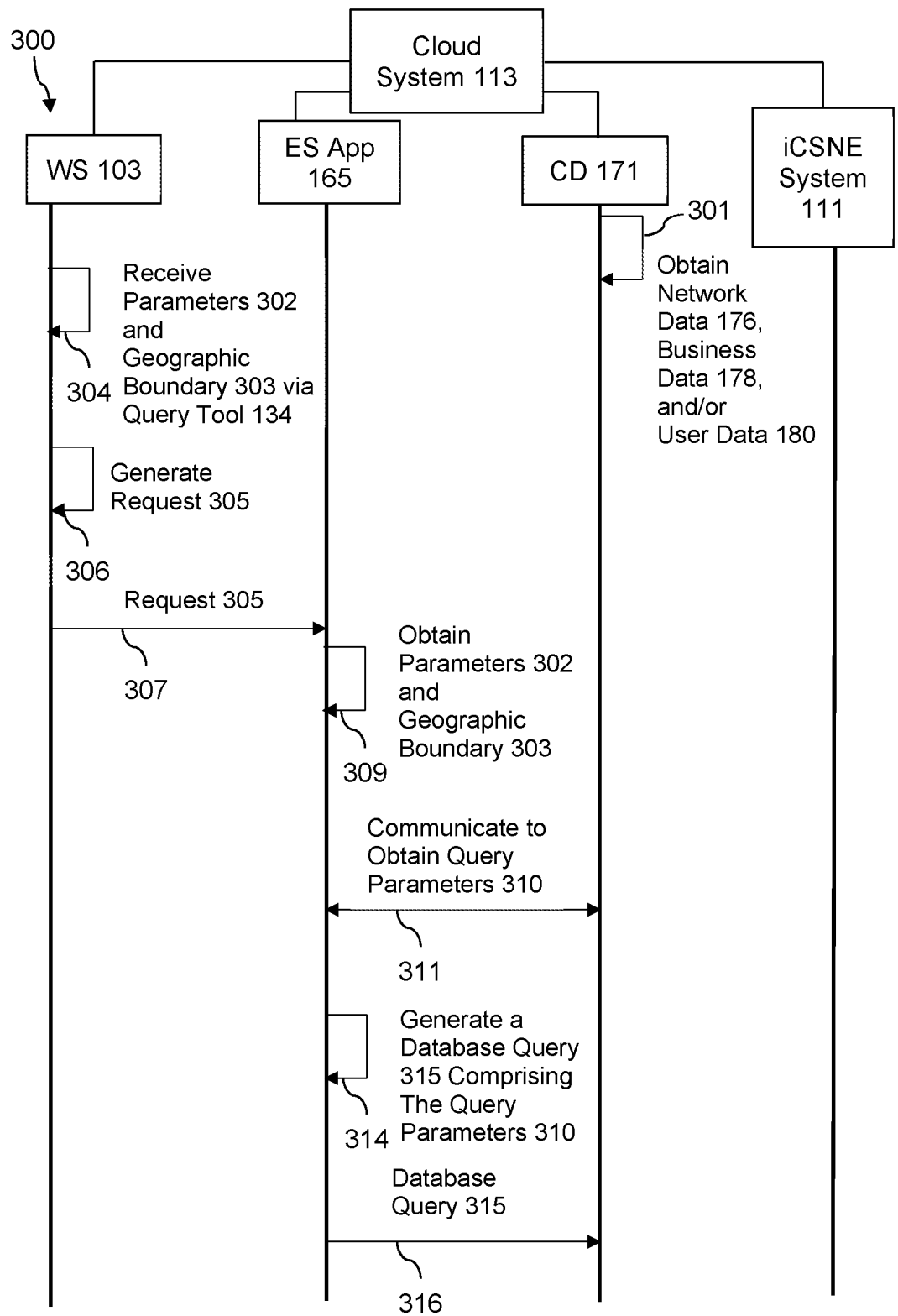
FIGS. 3A-B is a message sequence diagram illustrating an example method performed by components in the communication system of FIG. 1 according to an embodiment of the disclosure.
Figure 3B:
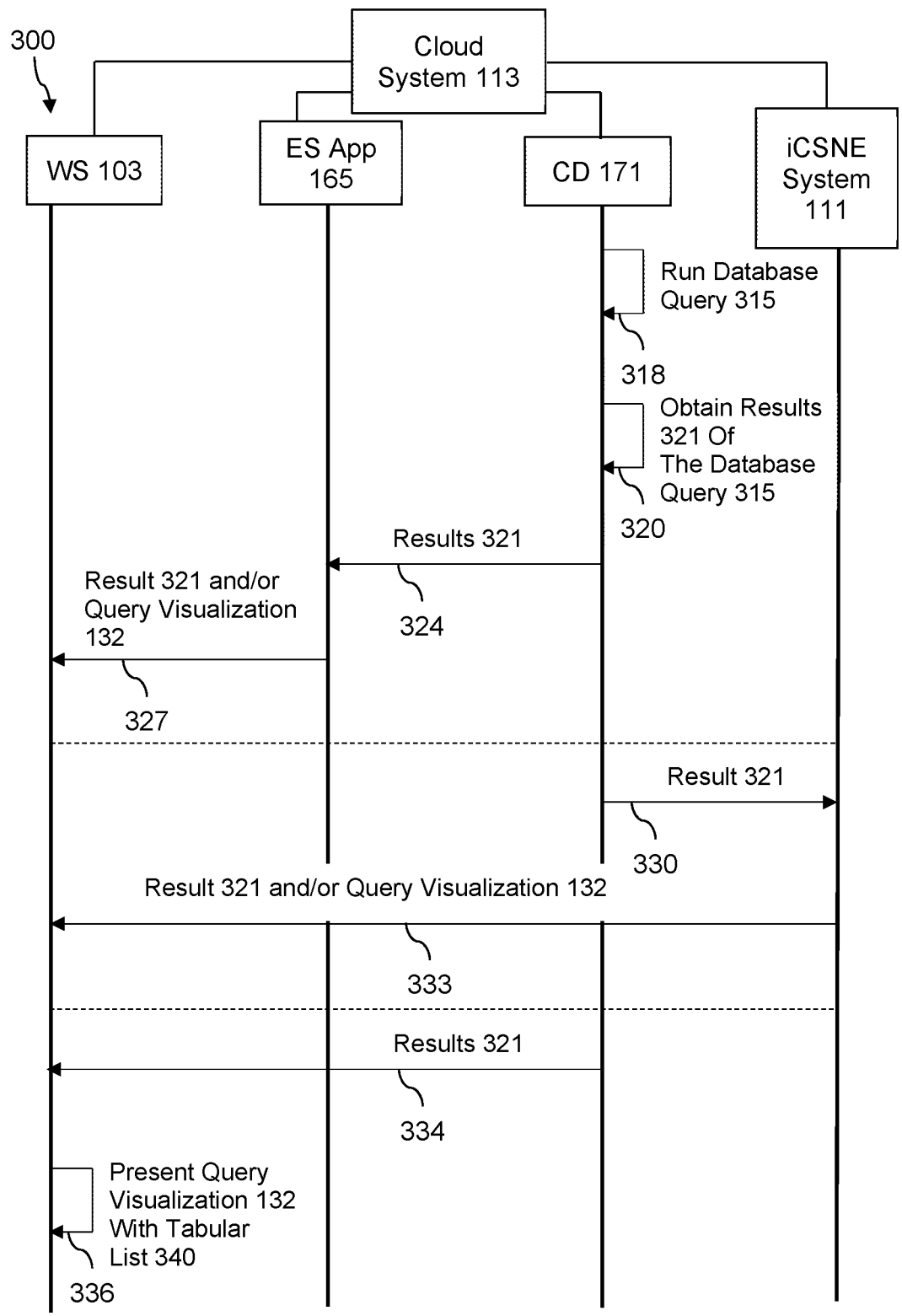

Turning now to FIGS. 3A-B, shown is a message sequence diagram illustrating a method 300, performed by the workstation 103, the cloud system 113, and the iCSNE system 111. More specifically, the export service application 165 (shown in FIGS. 3A-B as the "ES App 165") and the cloud database 171 (shown in FIGS. 3A-B as the "CD 171") in the cloud system 113 may perform the steps of the cloud system 113 in method 300.

Turning now specifically to FIG. 3A, method 300 begins with step 301. At step 301, the cloud database 171 obtains the network data 176, business data 178, and user data 180 from one or more external databases. The databases may be located at different database storage or cloud systems located remote from the cloud system 113. One or more of the databases from which the network data 176, business data 178, and user data 180 is obtained may be open source databases. Alternatively, one or more of the databases from which the network data 176, business data 178, and user data 180 is obtained may be secure databases, which are authorized to communicate with the cloud database 171. In other embodiments, users operating workstations 103 may upload import files including the network data 176, business data 178, and user data 180, in which the import files are of a particular format. As mentioned above, these import files may be a Shapefile, TAB file, KML file, CSV file, or any other file containing data in association with geospatial features. The cloud database 171 may receive the network data 176, business data 178, and user data 180 from the one or more databases or in the import files, and convert the data into a format that is compatible with the cloud database 171. The cloud database may also normalize the data such that all the data in the cloud database 171 has a common geospatial frame of reference and format, which then allows the information to be combined and used for various different purposes, including those described herein. At this stage, various types of data are stored in the cloud database 171, and the data may be used to generate the multilayer geographic visualization 126 and the query visualization 132.

At step 304, the workstation 103 may receive, via the query tool 134 presented via the UI 123, parameters 302 and a geographic boundary 303 related to a data request. In an embodiment, the parameters 302 that may be selected via the query tool may include layer groups, data layers, and/or data conditions. A layer group may indicate a category of one or more types of data. A data layer may indicate specific data aggregations within the selected category of the layer group. The data conditions may specify additional detail regarding the queried data. For example, the user may filter through a data layer table based on a specific condition, in which the condition may be a column in the data layer table. The user of the workstation 103 may enter the parameters 302 manually via typing text into the query tool 134, or selecting the parameters 302 from a pre-defined list of different types of parameters 302 presented by the query tool 134. The geographic boundary 303 may be a pre-defined geographic boundary 303, in which the query tool 134 presents a list of different pre-defined geographic boundaries 303. The user may select one of the pre-defined geographic boundaries 303 from the list presented by the query tool 134. Alternatively, the user may interact with a map, such as the multilayer geographic visualization 126, presented on the UI 123 to select a user-defined geographic boundary 303. For example, the user may draw a shape around a portion of the map as the user-defined the geographic boundary 303. The user may draw the shape around the portion of the map to input the user-defined geographic boundary 303 with a mouse input device, an electronic pen, or a touchscreen stylus. As the user draws the user-defined geographic boundary 303, the presentation of the map on the UI 123 may update to represent the in-progress drawn boundary, for example as a contrasting color line overlaid on the map. Alternatively, the shape may be selected from a shape selection tool on the query tool. The shape selection tool may allow the user to select a particular shape, such as, for example, a circle, rectangle, or polygon. The user may select the shape and use that shape to indicate the user-defined the geographic boundary 303.

At step 306, the client application 119 at the workstation 103 may generate a request 305 based on the parameters 302 and the geographic boundary 303 received from the user. The request 305 may be a Hypertext Transfer Protocol (HTTP) request. The client application 119 may determine location information for the geographic boundary 303, which may be, for example, latitude and longitude coordinate ranges covering the area within the geographic boundary 303, or latitude and longitude coordinates of points along the geographic boundary 303. The client application 119 may generate the request 305 to include the parameters 302 and the location information of the geographic boundary 303, and then transmit the request 305 to the export service application 165, at step 307.

At step 309, the export service application 165 may obtain (e.g., extract) the parameters 302 and the location information of the geographic boundary 303 from the request 305. In an embodiment, at step 311, the export service application 165 may communicate with the cloud database 171 to convert the parameters 302 and the location information of the geographic boundary 303 into query parameters 310. The query parameters 310 may indicate the same content as the parameters 302 and the location information of the geographic boundary 303. However, the query parameters 310 may be formatted to be compatible with the cloud database 171, in a manner such that the query parameters 310 may be used as parameters in a database query executed on the cloud database 171. To this end, the export service application 165 may first determine the format of the parameters 302 and the location information of the geographic boundary 303 contained in the request 305. The export service application 165 may then communicate with the cloud database 171 to determine a geospatial format of the data stored at the cloud database 171, and may determine functions used to convert the format of the parameters 302 and the location information of the geographic boundary 303 into the query parameters 310. The export service application 165 may then convert the parameters 302 and the location information of the geographic boundary 303 into the query parameters 310, using various geospatial formatting functions and libraries.

At step 314, the export service application 165 may generate a database query 315 including the query parameters 310. The database query 315 may be a query string indicating a request to retrieve data from the cloud database 171 based on the query parameters 310 (i.e., the data to be retrieved should be associated with or match the query parameters 310). At step 316, the export service application 165 may transmit the database query 315 to the cloud database 171.

Referring now to FIG. 3B, method 300 continues with step 318. At step 318, the cloud database 171 may run (i.e., execute) the database query 315 based on the query parameters 310. As mentioned above, the cloud database 171 may include one or more databases or data stores of data, and may be stored across one or more database servers. The cloud database 171 may run the database query 315 across all of the databases and data stores in each database server. In running the database query 315, the cloud database 171 may retrieve the data that matches the query parameters 310. For example, if the parameters 302 from which the database query 315 was generated included a layer group directed to a business, a data layer directed to retail stores, and a data condition of a particular retail store name, the cloud database 171 may retrieve the business data 178 related to retail stores of the particular retail store name. The data retrieved in response to running the database query 315 may be referred to as the "result" 321 of running the database query 315. At step 320, the cloud database 171 may aggregate the retrieved data as the result 321 of the database query 315.

The result 321 of the database query 315 may be used to create the query visualization 132 in various different ways, as shown in FIG. 3B. The result 321 may also be used to generate a tabular list 340 indicating the results in a format compatible with the workstation 103, and used to generate an exported spreadsheet also indicating the results in a format compatible with the workstation 103. In a first embodiment shown by steps 324 and 327, the cloud database 171 may transmit the results 321 of the database query 315 to the export service application 165, at step 324. The results 321 may be transmitted back to the export service application 165 as an HTTP response. In this embodiment, the export service application 165 may generate (e.g., render) the query visualization 132, and transmit the query visualization 132 to the workstation 103 for display. For example, the export service application 165 may have access to the geospatial libraries and functions used to generate the query visualization 132, and may use these libraries and functions to generate the query visualization 132 using the results 321 of the database query 315. At step 327, the export service application 165 may transmit the results 321 and/or the query visualization 132 to the workstation 103. In an embodiment, the export service application 165 may also transmit the results 321 of the database query 215 as a tabular list 340, a spreadsheet, or in the form of another data structure. In this way, the workstation 103 is supplied with not only the query visualization 132, but also the data in the results 321 of the database query 315.

In a second embodiment shown by steps 330 and 333, the cloud database 171 may transmit the results 321 of the database query 315 to the visualization application 153 at the iCSNE system 111, at step 330. In this embodiment, the visualization application 153 may generate (e.g., render) the query visualization 132, and transmit the query visualization 132 to the workstation 103 for display. For example, the visualization application 153 may have access to the geospatial libraries and functions, stored in the container 147, which may be used to generate the query visualization 132. The visualization application 153 may use these libraries and functions to generate the query visualization 132 using the results 321 of the database query 315. At step 333, the export service application 165 may transmit the results 321 and/or the query visualization 132 to the workstation 103. In an embodiment, the export service application 165 may also transmit the results 321 of the database query 215 as a tabular list 340, a spreadsheet, or in the form of another data structure.

In a third embodiment shown by steps 334, the cloud database 171 may transmit the results 321 of the database query 315 to the client application 119 at the workstation 103, at step 334. In this embodiment, the client application 119 may generate (e.g., render) the query visualization 132, and present the query visualization 132 for display by the workstation 103. For example, the client application 119 may have access to the geospatial libraries and functions, which may be used to generate the query visualization 132. The client application 119 may use these libraries and functions to generate the query visualization 132 using the results 321 of the database query 315. The client application 119 may also convert the results 321 of the database query 215 into the tabular list 340, the spreadsheet, or in the form of another data structure.

Regardless of whether the foregoing first embodiment, second embodiment, or third embodiment is performed, the client application 119 at the workstation 103 obtains or receives the query visualization 132 based on the results 321 of the database query 315. At step 336, the client application 119 may present the query visualization 132 as a standalone visualization or overlaid on top of the map by which the user initially selected the parameters 302 and geographic boundary 303. The query visualization 132 may be interactively combined with any other underlying visualization also presented on the map or with the various layers presented on the multilayer geographic visualization 126. For example, various layers from different data sources may be already be presented on the multilayer geographic visualization 126 when the user selected the parameters 302 and geographic boundary 303. The client application 119 may present the query visualization 132 as another layer on top of the multiple layers already presented by multilayer geographic visualization 126, to create an enhanced visualization of various different data types data.

Figure 4A:
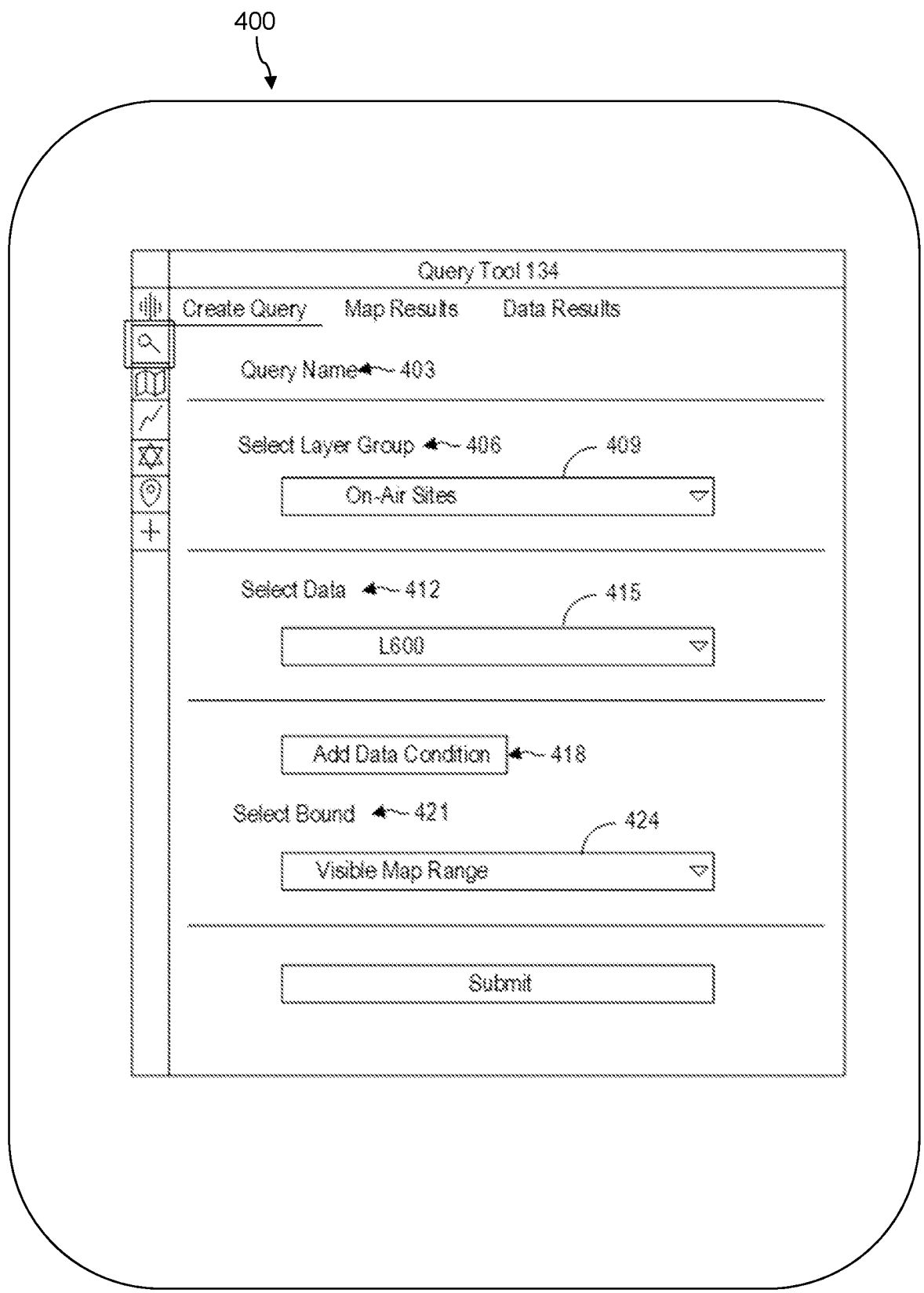
FIGS. 4A-D are illustrations of example user interface screens presented at a workstation of the communication system of FIG. 1 according to an embodiment of the disclosure.

Turning now to FIGS. 4A-D, various example screens of the UI 123 presented on the workstation 103 are described. Referring first to FIG. 4A, shown is a screen 400 in which the UI 123 presents an example of a query tool 134. In an embodiment, the query tool 134 may be presented on the side of a map, such as the multilayer geographic visualization 126. In another embodiment, the query tool 134 may be presented as a separate standalone window. In an embodiment, the client application 119 may generate the UI 123, and may communicate with the carrier network 108, the iCSNE system 111, and/or the cloud system 113 via a series of API calls using the APIs 135, 144, 156, and 168 based on instructions and data received via the query tool 134.

The query tool 134 is a user interface tool by which the user may interact with the UE 123 to select or enter the parameters 302 and the geographic boundary 303 to request data from the cloud database 171. The query tool 134 may include a query name 403, in which the user can edit the name of the data request 305. The query name 403 may be saved such that the same parameters 302 and the geographic boundary 303 may be submitted as another data request 305 without having to re-enter the parameters 302 and the geographic boundary 303 into the query tool 134. The query tool 134 may also include a select layer group 406 section, by which a user may select a particular layer group 409 as a parameter 302 in the data request 305 from a drop-down menu indicating different layer groups 409. In the example shown in FIG. 4A, the layer group 409 is directed to on-air cell sites, and the data being queried is directed to the broad category of data related to on-air cell sites. The query tool 134 may also include a select data 412 section, by which a user may select a data layer 415 as a parameter 302 in the data request 305 from a drop-down menu indicating a list of pre-defined data layers 415 in the layer group 409. In the example shown in FIG. 4A, the data layer 415 is directed to the L600 cellular technologies (i.e., a particular type of technology supported by a cell site). In this way, the data being queried for is directed to on-air cell sites that support the L600 cellular technologies. The query tool 134 may also include an add data condition 418 button, by which a user may select to add one or more data conditions or filters by which to further narrow the data being queried. The query tool 134 may also include a select bound 421 section, by which a user may select a geographic boundary 303 in the data request 305 from a drop-down menu indicating a list of pre-defined geographic boundaries 303. In the example shown in FIG. 4A, the data layer 415 is directed to the L600 cellular technologies within a visible map range 424 (i.e., an entire visible range of the map or multilayer geographic visualization 126 shown on the screen of the UI 123). The user may select the "Submit" icon to trigger the client application 119 to generate the request 305 based on the parameters 302 entered through the query tool 134.

Figure 4B:
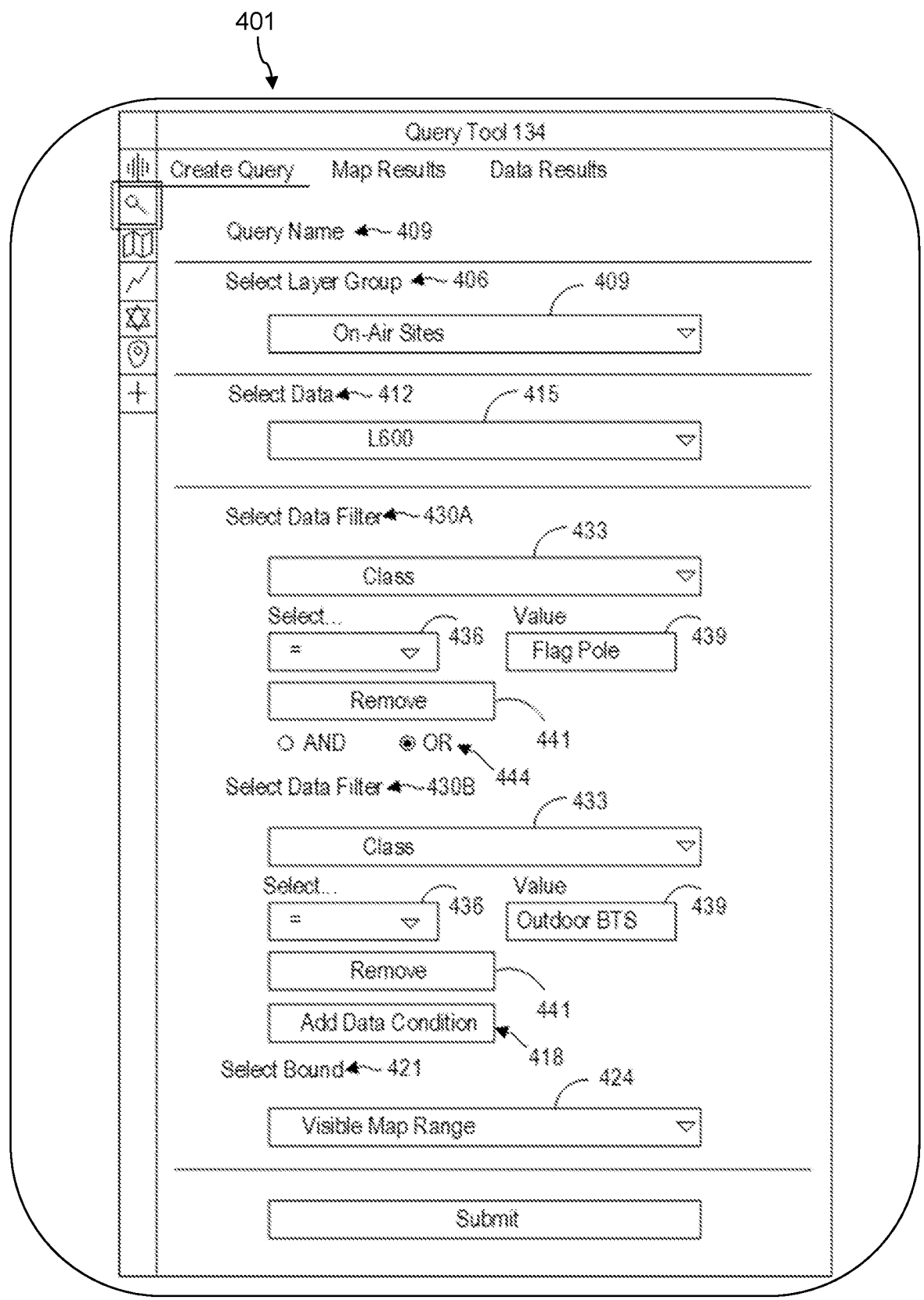

Referring next to FIG. 4B, shown is another example screen 401 of the query tool 143, which is similar to query tool 143 shown in FIG. 4A, except that the query tool 143 shown in FIG. 4B allows for the selection/entry of one or more data conditions through the select data filter 430A and 430B sections. The data filter 430A section includes drop-down lists for a class 433, an operator 436, and a value 439. In the example shown in FIG. 4B, the user may select the class 433 from the drop-down list of pre-defined data conditions or filters in the layer group 409 and the data layer 415. The user may also select the operator 436 from the drop-down list of pre-defined operators. In the example shown in FIG. 4B, the operator 436 is an "=" operator. The user may also manually enter, via a keyboard on the workstation 103, a value 439 of the class 433. In the example shown in FIG. 4B, the client application 119 may obtain a parameter 302 from the data filter 430A section indicating that a class 433 should be equal to (i.e. =) a "flag pole." The query tool 143 may also include a "Remove" icon, which may be selected by the user to remove the data condition entered through the data filter 430A section.

The query tool 143 may include selectors by which the user may add multiple different data conditions, which may be combined in the query or used as alternatives to one another. The user may add as many data conditions to the data request 305 as required using the selectors. For example, the user may use the selectors, shown as the "And" or "Or" icons 444, to indicate whether the second data condition indicated in the second data filter 430B section is to be conditionally searched in addition to the first data condition indicated in the first data filter 430A section or as an alternative to the first data condition indicated in the first data filter 430A section. The data filter 430B section also includes drop-down lists for a class 433, an operator 436, and a value 439. In the example shown in FIG. 4B, the client application 119 may obtain a parameter 302 from the data filter 430B section indicating that a class 433 should be equal to (i.e. =) a "outdoor base transceiver station (BTS)." The query tool 143 may also include a "Remove" icon, which may be selected by the user to remove the data condition entered by the data filter 430B section.

Figure 4C:
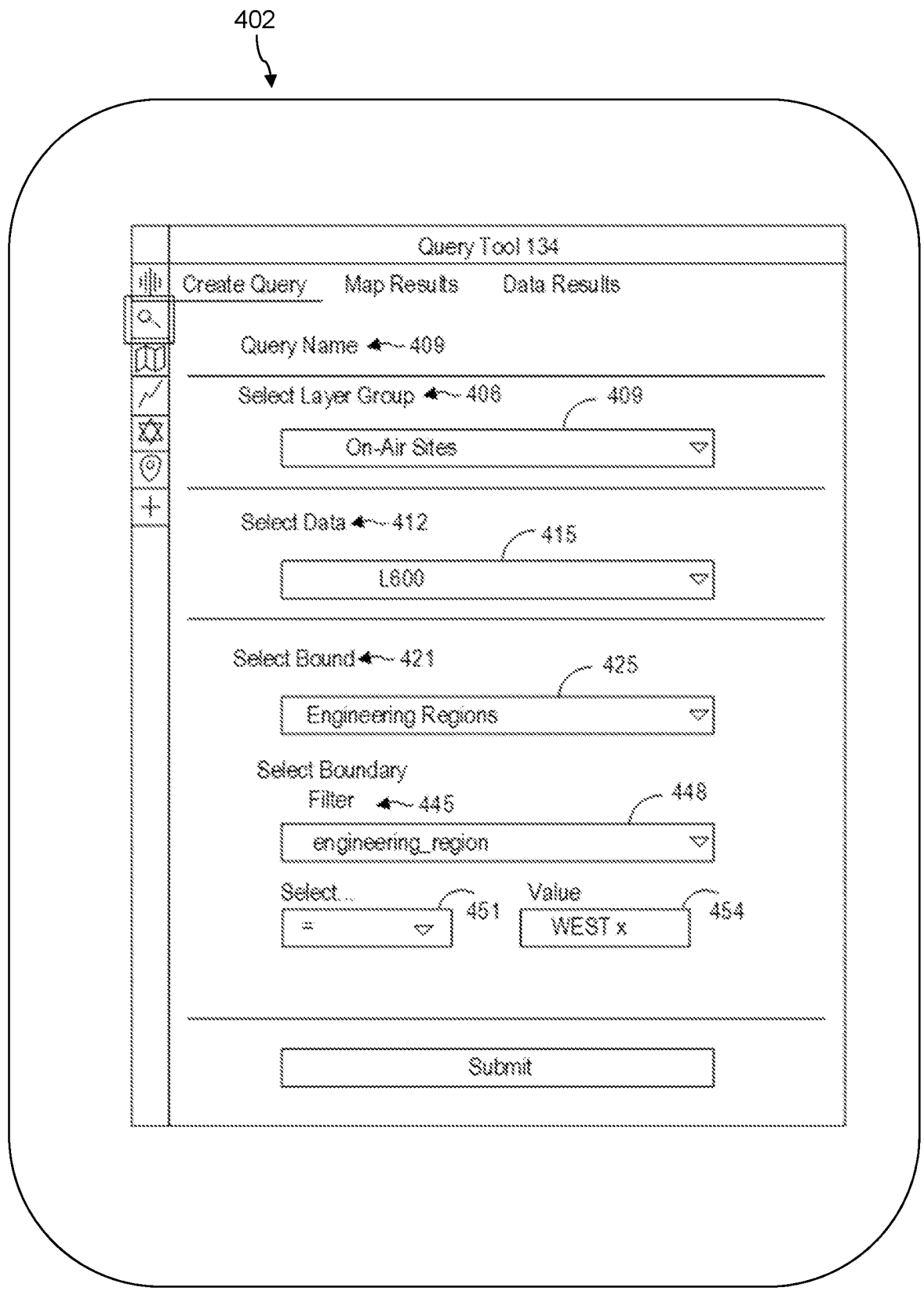

Referring next to FIG. 4C, shown is another example screen 402 of the query tool 143, which is similar to query tool 143 shown in FIG. 4A, except that the query tool 143 shown in FIG. 4C includes a different select bound 421 section. As mentioned above, a user may select a geographic boundary 303 in the data request 305 from a drop-down menu indicating a list of pre-defined geographic boundaries 303. In the example shown in FIG. 4C, the data layer 415 is directed to the L600 cellular technologies within an engineering region 425. The engineering region 425 may be pre-defined geographic regions defined by latitude and longitude boundaries, which are consistent and understood by a particular group of people or business enterprise. Other examples of pre-defined geographic boundaries 303 may include all the data (i.e., not limiting the data to a geographic boundary 303), an import layer boundary associated with imported data from a user, an iCSNE boundary, etc. The query tool 143 may also include a select boundary filter 445 section, in which the name of a particular engineering region 448 may be manually entered into the query tool 143 using the operator 451 and the value 454. In the example shown in FIG. 4C, the client application 119 may obtain the geographic boundary 303 from the boundary filter 445 section indicating that a name of an engineering region 448 should be equal to (i.e. =) a "WEST." As described above with reference to FIGS. 3A-B, the query visualization system may perform the steps of method 300 to generate the query visualization 132.

Figure 4D:
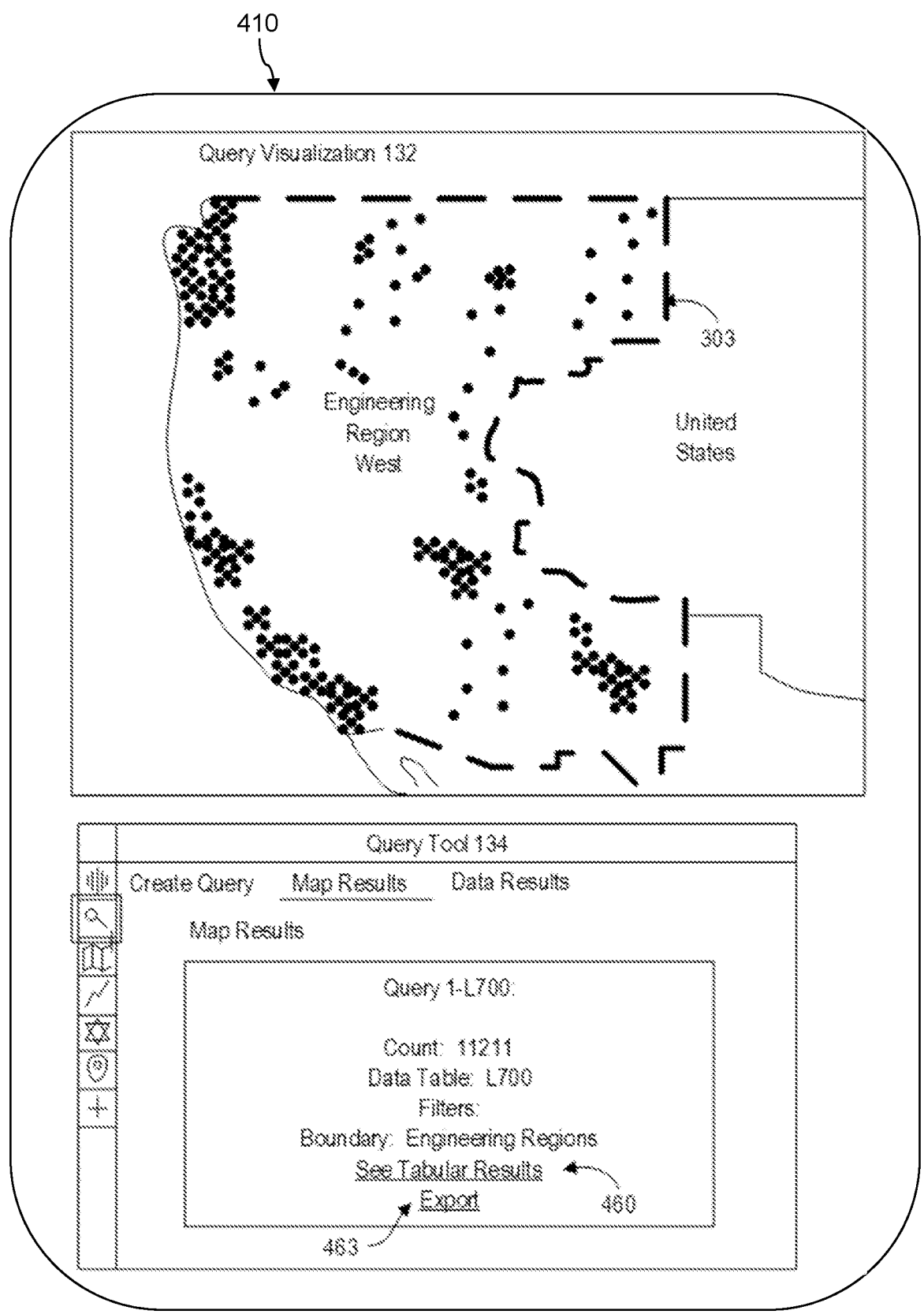

Referring next to FIG. 4D, shown is an example screen 410 of a query visualization 132 generated in response to the parameters 302 and geographic boundary 303 entered through the query tool 143 shown in FIGS. 4A-C. The query visualization 132 shown in FIG. 4D provides a visualization of on-air cell sites that support the L600 cellular technologies within the western engineering region of an enterprise. The dots on the query visualization indicate locations of the on-air cell sites that support the L600 cellular technologies. The users may change the color of different elements of the query visualization 132 (i.e., the dots) as they see fit to represent different types of data. As shown in FIG. 4D, there are no dots displayed outside the geographic boundary 303 of the western engineering region since the query was not performed on any data pertaining to a region outside the western engineering region. It should be appreciated that FIG. 4D shows one example of a query visualization 132 of the queried data, but this disclosure encompasses various ways of visualization data that has been queried for using the query tool 134.

The screen 410 may also include another example query tool 134 summarizing the results 321 of the database query 315 performed on the cloud database 171 based on the parameters 302 and geographic boundary 303 entered through the query tool 134. As shown in FIG. 4D, the query tool 134 may present a count of on-air cell sites that support the L600 cellular technologies within the western engineering region of an enterprise. The query tool 134 may also include an icon or link for tabular results 460, which the user may select to generate and present a tabular list 340 of the results 321 of the database query 315. The query tool 134 may also include an icon or link for exporting 463 the results 321 into a spreadsheet format that may be accessible offline and manipulated as needed. The user may select the icon or link for exporting 463 the results 321 to generate and present a spreadsheet of the results 321 of the database query 315. The tabular list 340 and/or the spreadsheet of results 321 may include additional details of each entry in the results 321, such as the actual location information (e.g., address, latitude and longitude coordinates), metadata, access/creation/manipulation data, etc. In some cases, the icon or link for exporting 463 the results 321 to generate and present a spreadsheet of the results 321 may only be enabled when the user of the workstation 103 has permission to export the data.

Figure 5:
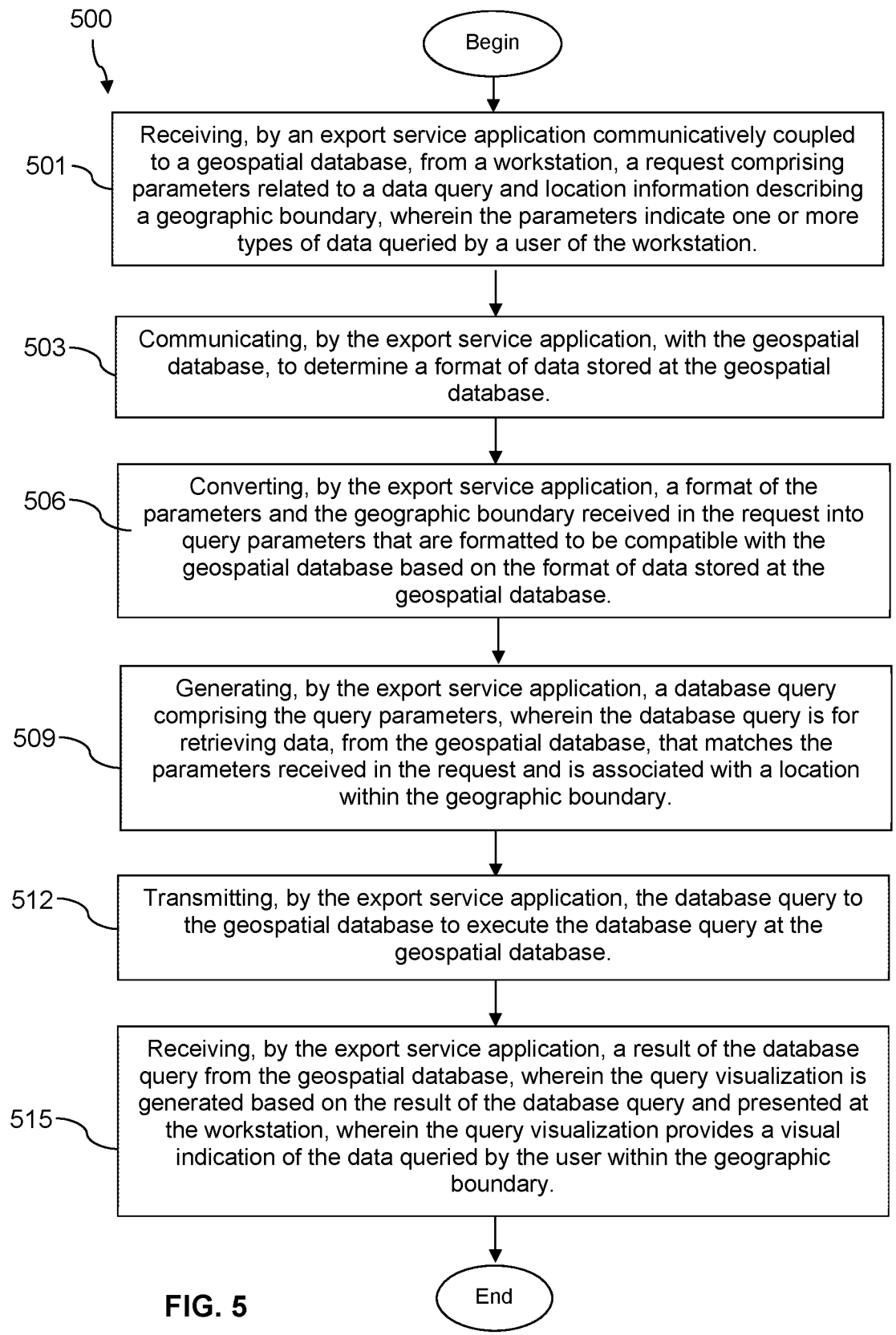
FIG. 5 is a flowchart of a first method according to an embodiment of the disclosure.

Turning now to FIG. 5, a method 500 is described. Method 500 may be implemented by the export service application 165. For example, method 500 may be performed by the export service application 165 after the workstation 103 receives the parameters 302 and geographic boundary 303 as user input and transmits a request 305 including the parameters 302 and location information of the geographic boundary 303 to the export service application 165.

Method 500 may begin with block 501. At block 501, method 500 comprises receiving, by an export service application 165 communicatively coupled to a geospatial database (i.e., cloud database 171), from a workstation 103, a request 305 comprising parameters 302 related to a data query and location information describing a geographic boundary 303. The parameters may indicate one or more types of data queried by a user of the workstation 103. In an embodiment, the geographic boundary is a user-defined boundary defined by a user draw input device, for example a mouse input device, an electronic pen input device, or a touchscreen stylus input device. The inputs may be received by the workstation 103 and an in-progress line representation of the user-defined boundary may be presented by the UI 123.

At block 503, method 500 comprises communicating, by the export service application 165, with the geospatial database, to determine a format of data stored at the geospatial database. At block 506, method 500 comprises converting, by the export service application 165, a format of the parameters 302 and the geographic boundary 303 received in the request 305 into query parameters 310. The query parameters 310 may be formatted to be compatible with the geospatial database based on the format of data stored at the geospatial database. At block 509, method 500 comprises generating, by the export service application 165, a database query 315 comprising the query parameters 310. The database query may be formatted as an SQL query string used to retrieve data, from the geospatial database, that matches the parameters 302 received in the request 305 and is associated with a location within the geographic boundary 303. At block 512, method 500 comprises transmitting, by the export service application 165, the database query 315 to the geospatial database to execute the database query 315 at the geospatial database. At block 515, method 500 comprises receiving, by the export service application 165, a result 321 of the database query 315 from the geospatial database. The query visualization 132 may be generated based on the result 321 of the database query 315 and presented for display at the workstation 103. The query visualization may provide a visual indication of the data queried by the user within the geographic boundary 303.

In an embodiment, the geographic boundary 303 is either a pre-defined boundary or a user-defined boundary, wherein the user-defined boundary is indicated by latitude and longitude coordinates received by the workstation 103 in the request 305. In an embodiment, method 500 further comprises generating, by the export service application 165, the query visualization 132 in a human viewable visualization format, and transmitting, by the export service application 165, the query visualization 132 and a tabular list 340 indicating the result 321 of the database query 315 to the workstation 103. In an embodiment, method 500 further comprises transmitting, by the export service application 165, the result 321 of the database query 315 to an application external to both the export service application 165 and the geospatial database, such as the visualization application 153. In this case, the visualization application 153 may generate the query visualization in a human viewable visualization format. In an embodiment, after receiving the result 321 of the database query 315, method 500 further comprises converting, by the export service application 165, the result 321 of the database query 315 into a tabular list 340 in a format compatible with the workstation 103, and transmitting, by the export service application 165, the tabular list 340 to the workstation 103.

Turning now to FIG. 6, a method 600 is described. Method 600 may be implemented by the system 100. For example, method 600 may be performed by the system 100 when the workstation 103 receives the parameters 302 and geographic boundary 303 as user input.

Method 600 may begin with block 603. At block 603, method 600 comprises receiving, from a user operating a workstation 103 via a query tool 134 presented on a UI 123 of the workstation 103, parameters 302 related to a data query and location information describing a geographic boundary 303. The parameters 302 may indicate one or more types of data queried by a user of the workstation 103. At block 606, method 600 comprises transmitting, by a client application 119 at the workstation 103, a request 305 comprising the parameters 302 and the location information describing the geographic boundary 303 to an export service application 165 positioned at a cloud system 113. At block 609, method 600 comprises communicating, by the export service application 165, with a geospatial database (i.e., cloud database 171) coupled to the export service application 165, to convert the parameters 302 received in the request 305 to query parameters 310 that are formatted to be compatible with the geospatial database. At block 612, method 600 comprises generating, by the export service application 165, a database query 315 comprising the query parameters 310. At block 615, method 600 comprises transmitting, by the export service application 165, the database query 315 to the geospatial database to execute the database query 315 at the geospatial database. At block 618, method 600 comprises receiving, by the export service application 165, a result 321 of the database query 315 from the geospatial database. The query visualization 132 may be generated based on the result 321 of the database query 315 and presented for display at the workstation 103. At block 621, method 600 comprises presenting, by the client application 119 at the workstation 103, the query visualization 132 via the UI 123 of the workstation 103. The query visualization 132 may provide a visual indication of the data queried by the user within the geographic boundary 303.

In an embodiment, method 600 further comprises receiving, from the user operating the query tool 134 at the workstation 103, a selection of the geographic boundary 303 on a multilayer geographic visualization 126 presented on the UI 123, and determining, by the client application 119 at the workstation 103, latitude and longitude coordinates of the geographic boundary 303 selected by the user, wherein the query visualization 132 is overlaid on top of a multilayer geographic visualization 126. In an embodiment, method 600 further comprises receiving, from the user operating the query tool 134 at the workstation 103, a selection of a pre-defined geographic boundary 303 from a displayed list of pre-defined geographic boundaries 303, and determining, by the client application 119 at the workstation 103, latitude and longitude coordinates of the selected pre-defined geographic boundary 303, wherein the location information of the geographic boundary 303 corresponds to the latitude and longitude coordinates of the selected pre-defined geographic boundary 303.

Figure 7A:
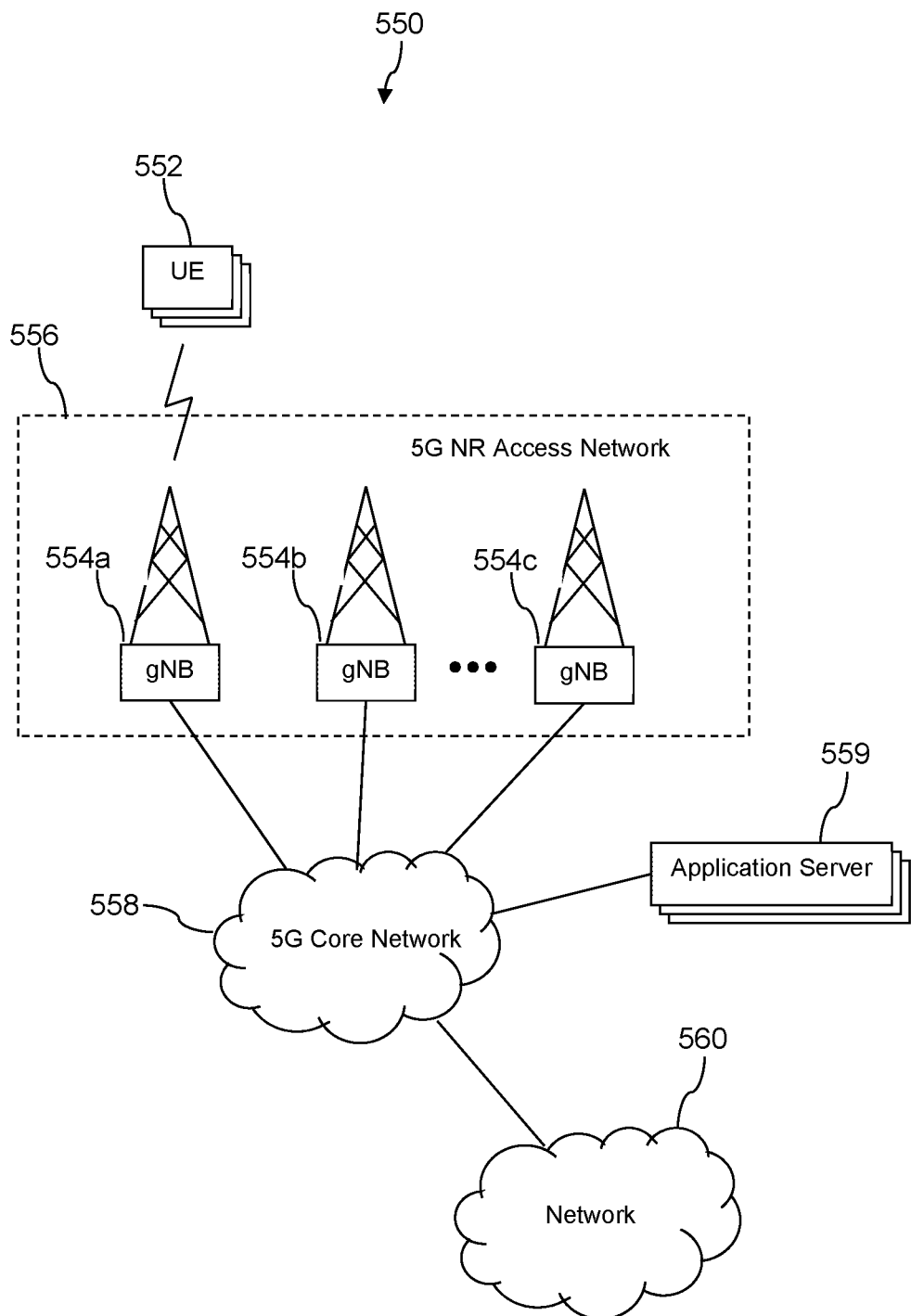
FIGS. 7A-B are block diagrams illustrating a communication system similar to the communication system of FIG. 1 according to an embodiment of the disclosure.

Turning now to FIG. 7A, an exemplary communication system 550 is described. In an embodiment, the communication system 550 may be implemented in the system 100 of FIG. 1. The communication system 550 includes a number of access nodes 554 that are configured to provide coverage in which UEs 552, such as cell phones, tablet computers, machine-type-communication devices, tracking devices, embedded wireless modules, and/or other wirelessly equipped communication devices (whether or not user operated), or devices such as the UE 102 and workstation 103, can operate. The access nodes 554 may be said to establish an access network 556. The access network 556 may be referred to as RAN in some contexts. In a 5G technology generation an access node 554 may be referred to as a gigabit Node B (gNB). In 4G technology (e.g., LTE technology) an access node 554 may be referred to as an eNB. In 3G technology (e.g., CDMA and GSM) an access node 554 may be referred to as a base transceiver station (BTS) combined with a base station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554a, a second access node 554b, and a third access node 554c. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 7B:
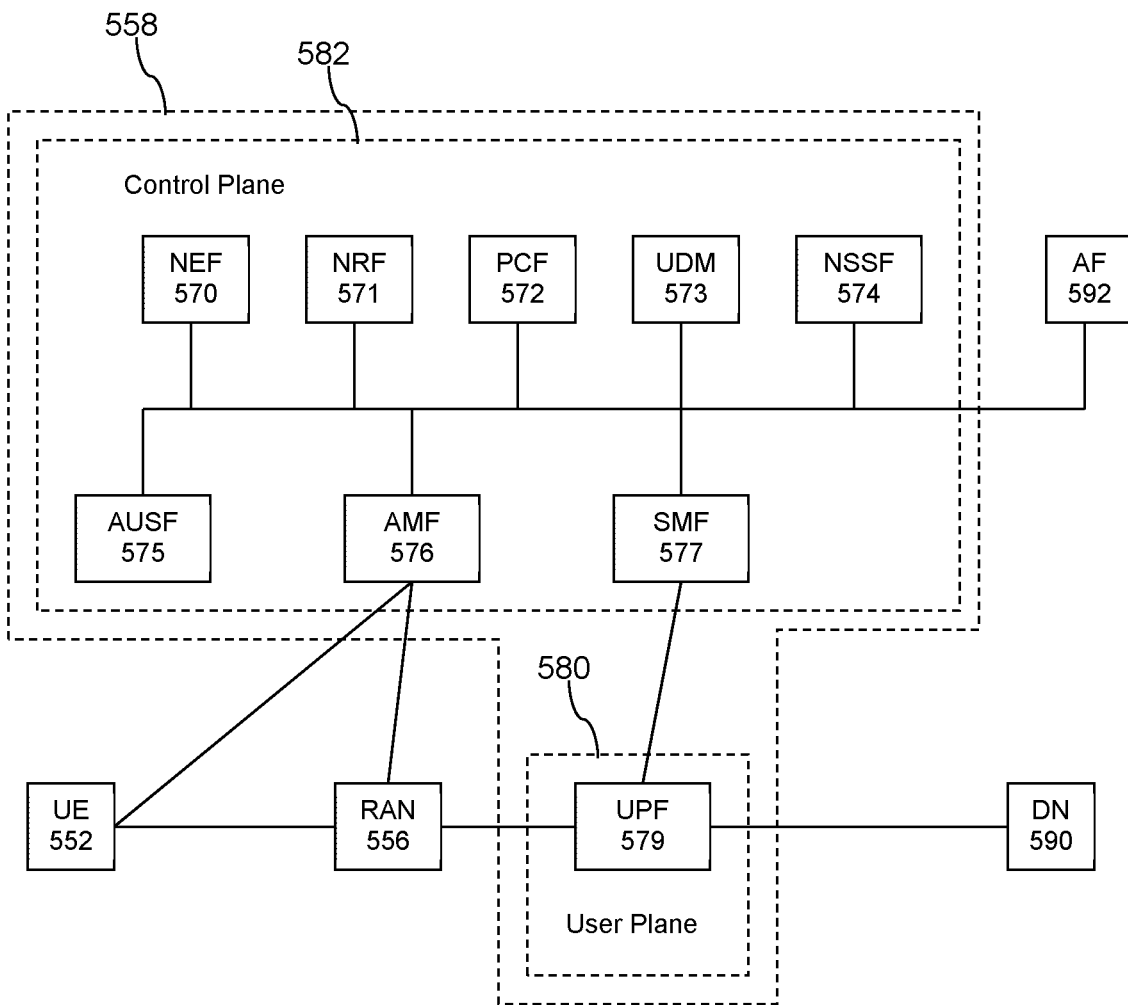

Turning now to FIG. 7B, further details of the core network 558 are described. In an embodiment, the core network 558 is a 5G core network. 5G core network technology is based on a service based architecture paradigm. Rather than constructing the 5G core network as a series of special purpose communication nodes (e.g., an HSS node, an MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access network 556, to a data network 590 (e.g., the network 560 illustrated in FIG. 7A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be execute on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 8:
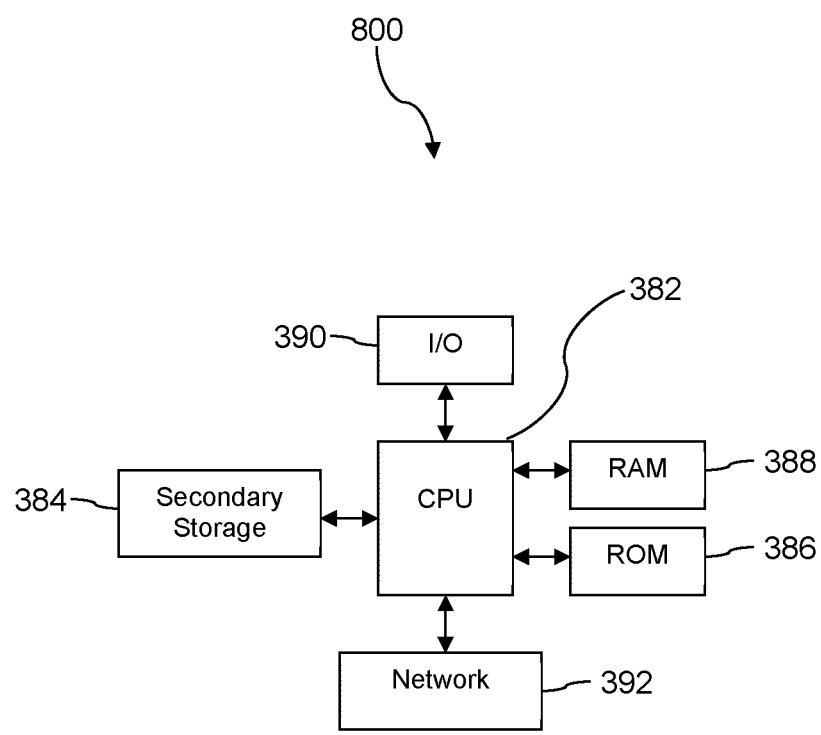
FIG. 8 is a block diagram of a computer system implemented within the communication system of FIG. 1 according to an embodiment of the disclosure.

FIG. 8 illustrates a computer system 800 suitable for implementing one or more embodiments disclosed herein. In an embodiment, the UE 102 and the workstation 103 may be implemented as the computer system 800. The computer system 800 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 800, at least one of the CPU 382, the RAM 388, and the ROM 386 are changed, transforming the computer system 800 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 800 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embodied in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 800 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 800 to provide the functionality of a number of servers that is not directly bound to the number of computers in the computer system 800. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 800, at least portions of the contents of the computer program product to the secondary storage 384, to the ROM 386, to the RAM 388, and/or to other non-volatile memory and volatile memory of the computer system 800. The processor 382 may process the executable instructions and/or data structures in part by directly accessing the computer program product, for example by reading from a CD-ROM disk inserted into a disk drive peripheral of the computer system 800. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 800.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 800 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method performed by a system to generate a query visualization, wherein the method comprises:
   obtaining, by a geospatial database, data from different source databases;
   converting and normalizing, by the geospatial database, the data received from the different source databases into files that are compatible with the geospatial database;
   storing the files in one or more memories at the geospatial database;
   receiving, from a user operating a workstation, via a query tool presented by a user interface of the workstation, parameters related to a data query and location information describing a geographic boundary, wherein the parameters indicate one or more types of data queried by a user of the workstation;
   transmitting, by a client application at the workstation, a request comprising the parameters and the location information describing the geographic boundary to an export service application positioned at a cloud system and coupled to the geospatial database;
   communicating, by the export service application, with the geospatial database, to convert the parameters received in the request to query parameters that are formatted to be compatible with the geospatial database;
   generating, by the export service application, a database query comprising the query parameters;
   transmitting, by the export service application, the database query to the geospatial database to execute the database query at the geospatial database;
   receiving, by the export service application, a result of the database query from the geospatial database, wherein the result of the database query comprises data from one or more of the files stored at the geospatial database, and wherein the query visualization is generated based on the result of the database query and presented at the workstation; and
   presenting, by the client application at the workstation, the query visualization overlaid on top of a multilayer geographic visualization indicating various types of data wherein the query visualization provides a visual indication of the data queried by the user within the geographic boundary.

2. The method of claim 1, further comprising:
   receiving, from the user operating the query tool at the workstation, a user selection of the geographic boundary on the multilayer geographic visualization presented by the user interface; and
   determining, by the client application at the workstation, latitude and longitude coordinates of the geographic boundary selected by the user, wherein the latitude and longitude coordinates of the geographic boundary selected by the user is indicated as the location information in the request.

3. The method of claim 1, further comprising:
   receiving, from the user operating the query tool at the workstation, a selection of a pre-defined geographic boundary from a list of pre-defined geographic boundaries; and
   determining, by the client application at the workstation, latitude and longitude coordinates of the selected pre-defined geographic boundary, wherein the location information of the geographic boundary corresponds to the latitude and longitude coordinates of the selected pre-defined geographic boundary.

4. The method of claim 1, wherein the parameters comprise a layer group indicating a category of the one or more types of data, a data layer indicating data within the category of the layer group, and one or more data conditions specifying additional detail regarding data queried by the user.

5. The method of claim 1, further comprising:
   generating, by the export service application, the query visualization in a human viewable visualization format; and
   transmitting, by the export service application, the query visualization and a tabular list indicating the result of the database query to the workstation.

6. The method of claim 1, further comprising transmitting, by the export service application, the result of the database query to an application external to both the export service application and the geospatial database, wherein the application generates the query visualization in a human viewable visualization format.

7. The method of claim 1, wherein the database query is formatted as a Structured Query Language (SQL) query.

8. A method performed by a system to generate a query visualization, wherein the method comprises:
   receiving, by an export service application communicatively coupled to a geospatial database, from a workstation, a request comprising parameters related to a data query and location information describing a geographic boundary, wherein the parameters indicate one or more types of data queried by a user of the workstation;
   communicating, by the export service application, with the geospatial database, to determine a format of data stored at the geospatial database;
   converting, by the export service application, a format of the parameters and the geographic boundary received in the request into query parameters that are formatted to be compatible with the geospatial database based on the format of data stored at the geospatial database;
   generating, by the export service application, a database query comprising the query parameters, wherein the database query is for retrieving data, from the geospatial database, that matches the parameters received in the request and is associated with a location within the geographic boundary;
   transmitting, by the export service application, the database query to the geospatial database to execute the database query at the geospatial database; and
   receiving, by the export service application, a result of the database query from the geospatial database, wherein the query visualization is generated based on the result of the database query and presented at the workstation, wherein the query visualization provides a visual indication of the data queried by the user within the geographic boundary.

9. The method of claim 8, wherein the parameters comprise a layer group indicating a category of the one or more types of data, a data layer indicating data within the category of the layer group, and one or more data conditions specifying additional detail regarding data queried by the user.

10. The method of claim 8, wherein the geographic boundary is either a pre-defined boundary or a user-defined boundary, wherein the user-defined boundary is indicated by latitude and longitude coordinates received by the workstation in the request.

11. The method of claim 8, further comprising:
    generating, by the export service application, the query visualization in a human viewable visualization format; and transmitting, by the export service application, the query visualization and a tabular list indicating the result of the database query to the workstation.

12. The method of claim 8, further comprising transmitting, by the export service application, the result of the database query to an application external to both the export service application and the geospatial database, wherein the application generates the query visualization in a human viewable visualization format.

13. The method of claim 8, wherein after receiving the result of the database query, the method further comprises:
converting, by the export service application, the result of the database query into a tabular list, wherein the tabular list is in a format compatible with the workstation; and
transmitting, by the export service application, the tabular list to the workstation.

14. The method of claim 8, wherein the geographic boundary is a user-defined boundary defined by a user draw input device.

15. A system comprising:
a workstation comprising:
at least one processor;
at least one non-transitory memory; and
a client application stored in the at least one non-transitory memory, which when executed by the at least one processor, causes the at least one processor to be configured to:
receive, from a user operating the workstation via a query tool presented by a user interface of the workstation, parameters related to a data query and location information describing a geographic boundary, wherein the parameters indicate one or more types of data queried by a user of the workstation; and
transmit a request comprising the parameters and the location information describing the geographic boundary to an export service application positioned at a cloud system;
a cloud system comprising:
a geospatial database configured to store data used to generate a visualization;
at least one processor;
at least one non-transitory memory;
an export service application stored in the at least one non-transitory memory, which when executed by the at least one processor, causes the at least one processor to be configured to:
communicate with a geospatial database coupled to the export service application, to convert the parameters received in the request to query parameters that are formatted to be compatible with the geospatial database;
generate a database query comprising the query parameters;
transmit the database query to the geospatial database to execute the database query at the geospatial database; and
receive a result of the database query from the geospatial database, wherein a query visualization is generated based on the result of the database query and presented at the workstation,
wherein the client application further causes the at least one processor to present the query visualization via the user interface of the workstation, wherein the query visualization provides a visual indication of the data queried by the user within the geographic boundary.

16. The system of claim 15, wherein the client application further causes the at least one processor to:
receive a selection of the geographic boundary on a multilayer geographic visualization presented by the user interface; and
determine latitude and longitude coordinates of the geographic boundary selected by the user, wherein the query visualization is overlaid on top of the multilayer geographic visualization.

17. The system of claim 15, wherein the client application further causes the at least one processor to:
receive a selection of a pre-defined geographic boundary from a list of pre-defined geographic boundaries;
determine latitude and longitude coordinates of the selected pre-defined geographic boundary, wherein the location information of the geographic boundary corresponds to the latitude and longitude coordinates of the selected pre-defined geographic boundary.

18. The system of claim 15, wherein the parameters comprise a layer group indicating a category of the one or more types of data, a data layer indicating data within the category of the layer group, and one or more data conditions specifying additional detail regarding data queried by the user.

19. The system of claim 15, wherein the client application further causes the at least one processor to:
generate the query visualization in a human viewable visualization format; and
transmit the query visualization and a tabular list indicating the result of the database query to the workstation.

20. The system of claim 15, wherein the database query is formatted as a Structured Query Language (SQL) query.

* * * * *